US012699049B2

(12) United States Patent
Egan et al.

(10) Patent No.: US 12,699,049 B2
(45) Date of Patent: Aug. 4, 2026

(54) METHODS AND SYSTEMS TO MEASURE PROPERTIES OF MOVING PRODUCTS IN DEVICE MANUFACTURING MACHINES

(71) Applicant: Applied Materials, Inc., Santa Clara, CA (US)

(72) Inventors: Todd J. Egan, Fremont, CA (US); Avishek Ghosh, Maharashtra (IN); Edward W. Budiarto, Fremont, CA (US); Guoheng Zhao, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 300 days.

(21) Appl. No.: 18/122,106

(22) Filed: Mar. 15, 2023

(65) Prior Publication Data

US 2023/0213444 A1      Jul. 6, 2023

Related U.S. Application Data

(63) Continuation of application No. 16/996,579, filed on Aug. 18, 2020, now Pat. No. 11,609,183.

(51) Int. Cl.
| | |
|---|---|
| *G01N 21/41* | (2006.01) |
| *G01B 11/06* | (2006.01) |
| *G01B 11/30* | (2006.01) |
| *G01P 13/00* | (2006.01) |

(52) U.S. Cl.
CPC ......... *G01N 21/41* (2013.01); *G01B 11/0625* (2013.01); *G01B 11/303* (2013.01); *G01P*

13/00 (2013.01); *G01N 2201/06113* (2013.01); *G01N 2201/062* (2013.01); *G01N 2201/127* (2013.01)

(58) Field of Classification Search
None
See application file for complete search history.

(56) References Cited

U.S. PATENT DOCUMENTS

| | | | |
|---|---|---|---|
| 3,930,994 A * | 1/1976 | Conway | B07C 5/3416 |
| | | | 209/579 |
| 4,332,090 A * | 6/1982 | Bailey | G01C 9/18 |
| | | | 33/366.12 |
| 4,663,852 A * | 5/1987 | Guarini | G01B 21/045 |
| | | | 33/503 |
| 5,314,831 A | 5/1994 | Hirae et al. | |

(Continued)

FOREIGN PATENT DOCUMENTS

| | | |
|---|---|---|
| TW | 200506348 A | 2/2005 |
| TW | 202024564 A | 7/2020 |

*Primary Examiner* — Michelle M Iacoletti
*Assistant Examiner* — Jarreas Underwood
(74) *Attorney, Agent, or Firm* — Lowenstein Sandler LLP

(57) ABSTRACT

Described are systems and techniques directed to optical inspection of moving products (wafers, substrates, films, patterns) that are being transported to or from processing chambers in device manufacturing systems. Implementations include a system that has a first source of light to direct a first light to a first location on a surface of a product. The first light generates, at the first location, a first reflected light. The system further includes a first optical sensor to generate a first data representative of a first reflected light, and a processing device, in communication with the first optical sensor to determine, using the first data, a property of the product.

21 Claims, 10 Drawing Sheets

(56) References Cited

U.S. PATENT DOCUMENTS

| | | | | |
|---|---|---|---|---|
| 5,530,550 | A | 6/1996 | Nikoonahad et al. | |
| 5,539,514 | A * | 7/1996 | Shishido | G01N 21/956 |
| | | | | 356/239.8 |
| 5,636,258 | A | 6/1997 | Okumura et al. | |
| 5,757,483 | A | 5/1998 | Pierce, III | |
| 6,245,585 | B1 * | 6/2001 | Fujimoto | G03F 7/70358 |
| | | | | 257/E21.53 |
| 6,608,689 | B1 * | 8/2003 | Wei | G01B 11/16 |
| | | | | 250/559.27 |
| 7,433,056 | B1 * | 10/2008 | Janik | G01N 21/65 |
| | | | | 356/601 |
| 7,554,656 | B2 | 6/2009 | Shortt | |
| 8,078,304 | B2 * | 12/2011 | Rice | G05B 19/41875 |
| | | | | 414/935 |
| 8,965,102 | B2 | 2/2015 | Tien et al. | |
| 10,574,180 | B2 | 2/2020 | De Vos | |
| 10,978,330 | B2 * | 4/2021 | Yin | H01L 21/68 |
| 2002/0047896 | A1 * | 4/2002 | Basiji | G01J 3/2803 |
| | | | | 348/61 |
| 2002/0088952 | A1 * | 7/2002 | Rao | G01N 21/9501 |
| | | | | 250/559.45 |
| 2002/0113194 | A1 * | 8/2002 | Hu | H04N 25/711 |
| | | | | 250/208.1 |
| 2004/0130727 | A1 * | 7/2004 | Isozaki | G01N 21/9501 |
| | | | | 356/504 |
| 2006/0068512 | A1 | 3/2006 | Ohshima et al. | |
| 2007/0153285 | A1 * | 7/2007 | Elton | G01N 21/57 |
| | | | | 356/446 |
| 2010/0239397 | A1 * | 9/2010 | Irie | H01L 21/67742 |
| | | | | 700/228 |
| 2010/0310341 | A1 * | 12/2010 | Mok | H01J 37/20 |
| | | | | 414/222.01 |
| 2013/0308142 | A1 * | 11/2013 | Straaijer | G01B 11/02 |
| | | | | 356/625 |
| 2014/0293295 | A1 | 10/2014 | Kuwabara | |
| 2017/0258432 | A1 * | 9/2017 | Choi | A61B 6/563 |
| 2018/0301322 | A1 * | 10/2018 | Sugita | H01J 37/32642 |
| 2021/0262780 | A1 * | 8/2021 | Gao | G01S 17/06 |

* cited by examiner

100

Processing Chamber 106

Wafer in Chamber 116

Processing Chamber 106

Electronics Module

Measurement Heads 114

150

Wafer 112

Robot Blade 110

Transfer Chamber 104

Loading Station 102

Robot 108

Computing Device 118

Blade Control Module 120

Inspection Control Module 122

Wafer Quality Control Module 124

150

200

600

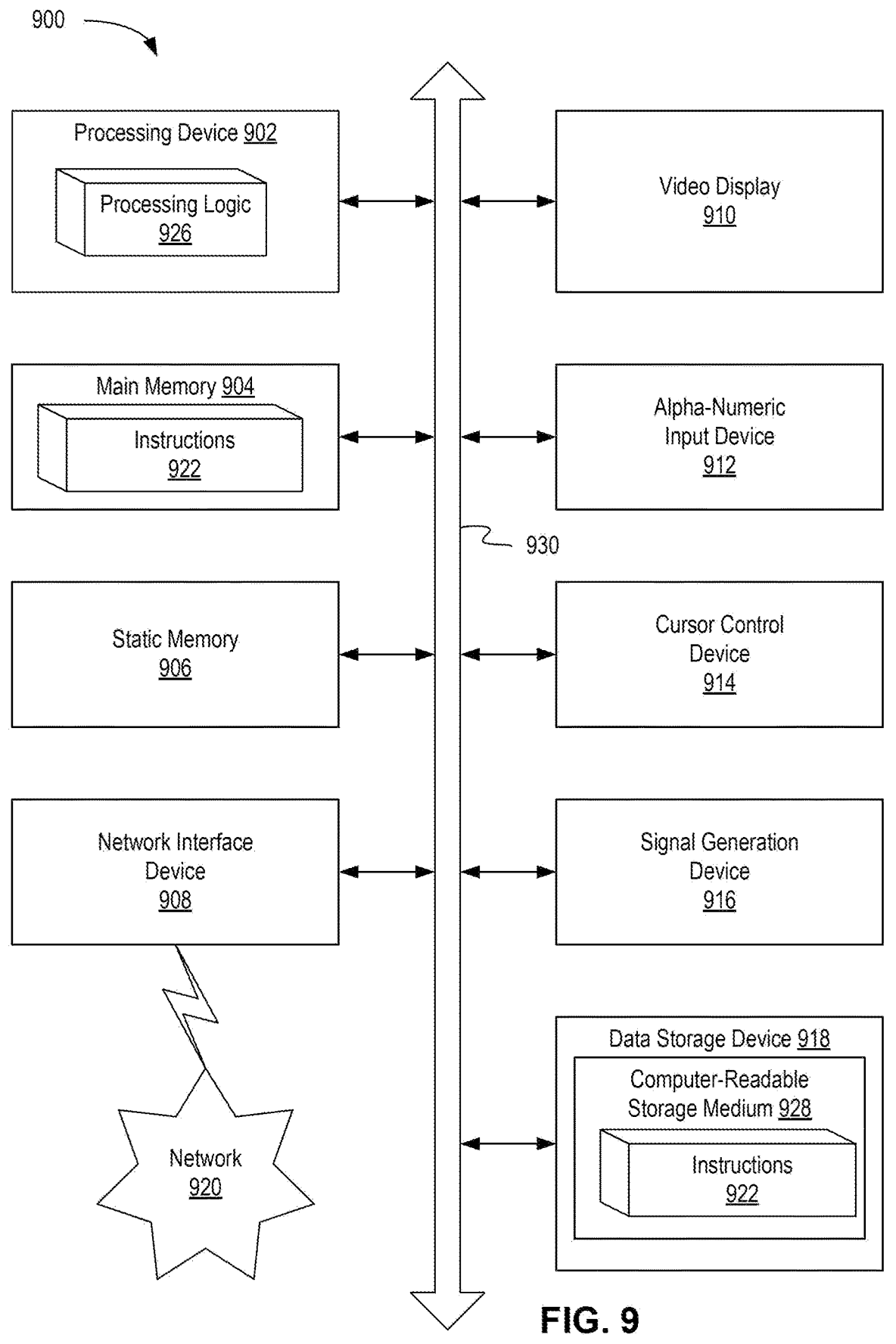

900

Processing Device 902

Processing Logic
926

Main Memory 904

Instructions
922

Static Memory
906

Network Interface
Device
908

Network
920

930

Video Display
910

Alpha-Numeric
Input Device
912

Cursor Control
Device
914

Signal Generation
Device
916

Data Storage Device 918

Computer-Readable
Storage Medium 928

Instructions
922

FIG. 9

METHODS AND SYSTEMS TO MEASURE PROPERTIES OF MOVING PRODUCTS IN DEVICE MANUFACTURING MACHINES

RELATED APPLICATIONS

This application is a continuation application of co-pending U.S. patent application Ser. No. 16/996,579, filed Aug. 18, 2020, which is incorporated herein by reference.

TECHNICAL FIELD

This instant specification generally relates to controlling quality of wafer (substrate) yield of systems used in electronic device manufacturing, such as various processing chambers. More specifically, the instant specification relates to post-processing optical inspection of wafers while the wafers are being transported from a processing chamber.

BACKGROUND

Manufacturing of modern materials often involves various deposition techniques, such as chemical vapor deposition (CVD) or physical vapor deposition (PVD) techniques, in which atoms of one or more selected types are deposited on a wafer (substrate) held in low or high vacuum environments that are provided by vacuum processing (e.g., deposition, etching, etc.) chambers. Materials manufactured in this manner may include monocrystals, semiconductor films, fine coatings, and numerous other substances used in practical applications, such as electronic device manufacturing. Many of these applications depend critically on the purity of the materials grown in the processing chambers. The need to maintain isolation of the inter-chamber environment and to minimize its exposure to ambient atmosphere and contaminants therein gives rise to various robotic techniques of sample manipulation and chamber inspection. Improving precision, reliability, and efficiency of such robotic techniques presents a number of technological challenges whose successful resolution is crucial for continuing progress of electronic device manufacturing. This is especially important given that the demands to the quality of chamber manufacturing products are constantly increasing.

SUMMARY

In one implementation, disclosed is an optical device having a first source of light to direct a first light to a first location on a surface of a product, the product being transported to or from a processing chamber. The first light is to generate, at the first location, a first reflected light. The optical device further includes a first optical sensor to generate, while the product is in motion, a first data representative of a first reflected light, and a processing device, in communication with the first optical sensor, to determine, using the first data, a property of the product.

In another implementation, disclosed is a method that includes directing a first light, produced by a first source of light, to a first location on a surface of a moving product, the product being transported to or from a processing chamber. The first light is to generate, at the first location, a first reflected light. The method further includes generating, while the product is in motion, by a first optical sensor, a first data representative of a first reflected light, and determining, using the first data, a property of the product.

BRIEF DESCRIPTION OF THE DRAWINGS

FIG. 9 depicts a block diagram of an example processing device operating in accordance with one or more aspects of the present disclosure and capable of supporting accurate optical inspection of wafers transported on a moving blade.

DETAILED DESCRIPTION

Figure 1A:
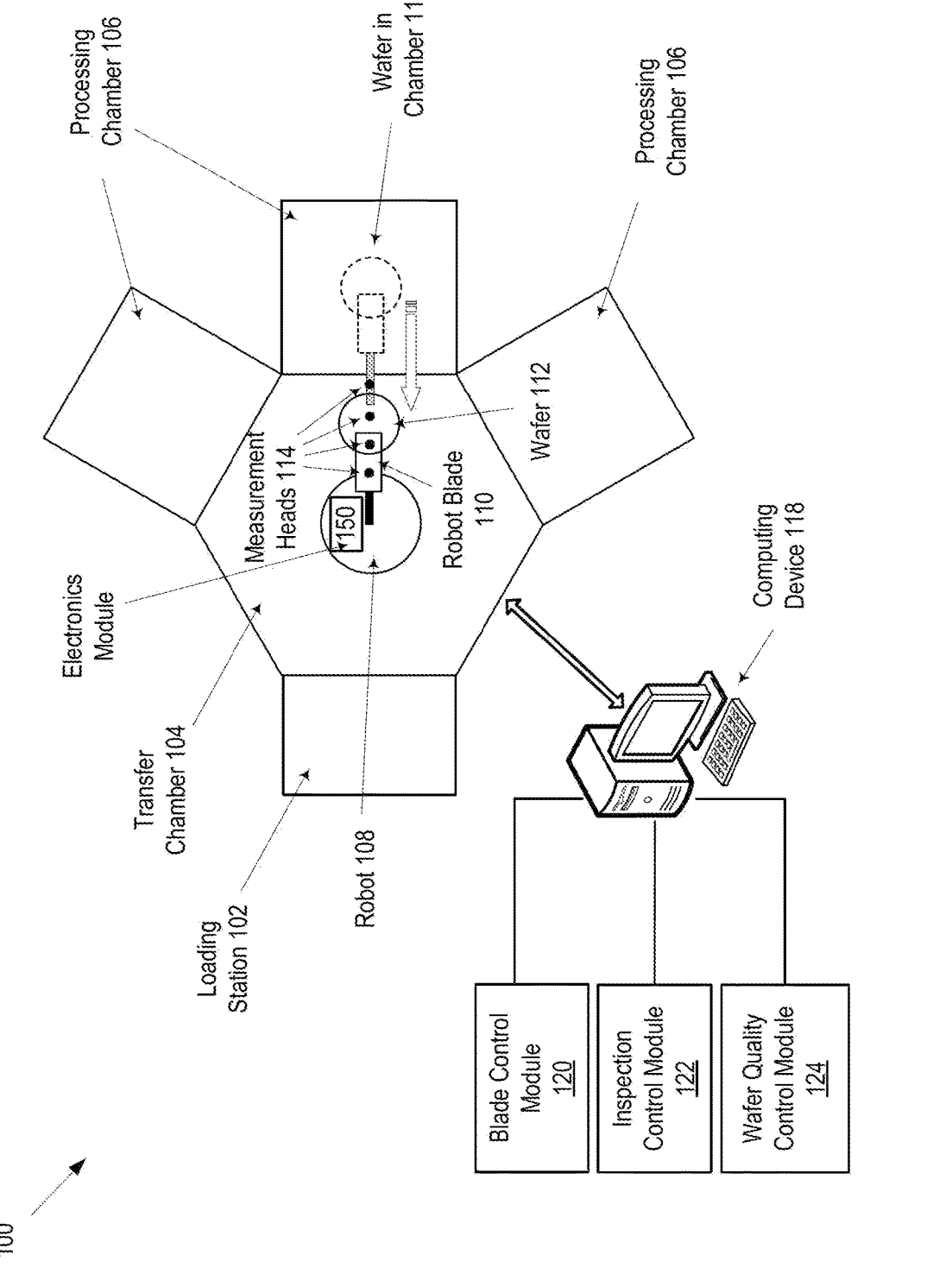
FIG. 1A illustrates one exemplary implementation of a manufacturing machine capable of supporting accurate optical inspection of wafers transported on a moving blade.

The implementations disclosed herein provide for contactless precision optical inspection of processed wafers while the wafers are being transferred from processing chambers (that may include deposition chambers, etching chambers, and so on). For example, the implementations disclosed may help accurately determine optical, physical, and morphological properties of the wafers, such as their uniformity, smoothness, thickness, refractive index, reflectivity, and so on, and provide an efficient quality control tool that does not require slowing down the manufacturing process.

The robotic systems allow a quick and efficient delivery of wafers for processing into a processing chamber and an automated retrieval of the processed wafers from the processing chamber. Robotic delivery/retrieval systems greatly increase a yield of the manufacturing process but pose some specific quality control challenges. At least some—and, ideally, all—processed wafers need to be examined for compliance to the process specification. Yet, stopping the manufacturing process (e.g., randomly or after processing of every n-th wafer) to test an occasional output wafer has a number of disadvantages. The wafer being tested, is, as a consequence, being exposed to a testing environment (e.g, of a testing chamber) for a longer period of time compared to those output wafers that are not subjected to the same testing. This introduces intrinsic inaccuracy into the testing procedure and, additionally, results in a non-uniformity of the wafer yield where the untested wafers may have properties that are somewhat different from the tested wafers (e.g., the tested wafers may have more contaminants due to a longer exposure to the post-processing environment). Furthermore, stopping the manufacturing process and then restarting it, even if performed occasionally, reduces the speed of wafer manufacturing.

The problem of the yield non-uniformity, prolonged exposure to the testing environment, and slowing down of the manufacturing process may be solved by performing wafer testing (using optical inspection methods) while the wafer is being transported from the processing chamber to the loading/unloading chamber. An optical inspection device may have a light source, to direct a beam of light at one or more target locations on the surface of the wafer, and an optical sensor to detect a light reflected from the surface and obtain reflectivity $R(\lambda)$ data for each target location on the surface, for a broad range of wavelengths $\lambda$. The reflectivity data may be obtained for some parts of visible, infrared (IR), and ultraviolet (UV) spectra, depending on the light source and the optical sensor used. Based on the reflectivity data, a processing device (e.g., a computing system equipped with a processor and a memory) may determine a variety of characteristics of the wafer: uniformity of the wafer, e.g., of the wafer thickness, (from comparison of the reflectivity $R(\lambda)$ across multiple locations of the wafer), the amount of contaminants (from comparing the reflectivity $R(\lambda)$ to a benchmark reflectivity stored in the memory), the smoothness of the surface of the wafer (from detecting a degree of non-specular—diffuse—reflection) from the wafer, and the like.

Because collection of optical inspection data may be performed while the wafer is moving, such motion may introduce errors resulting in imprecise characterization of the wafer. For example, as a result of the robot blade motion, the wafer may experience up-and-down (vertical) or side-to-side (horizontal) parallel displacements, and angular tilts around one of three spatial axes. For example, the wafer may experience a tilt around a horizontal direction (x direction, as depicted in FIG. 2A) of the robot blade's velocity—a roll. The wafer may experience a tilt around the horizontal direction (y direction) that is perpendicular to the blade's velocity—a pitch. Additionally, the wafer may experience a tilt around the vertical direction (z direction)—a yaw. Any of these parallel displacements and/or angular tilts may be small and undetectable without precision instruments. However, an optical path, which requires a calibration to a high degree of precision, may nonetheless be significantly affected by a tilt and/or a displacement. For example, if the thickness of the wafer ranges between 1-100 nm, a displacement of only a few angstroms may result in a significant error in determining the reflectivity $R(\lambda)$, or the refractive index $n(\lambda)$, or any other optical quantity that may be used to characterize the wafer, such as a polarization dependence of the reflectivity, an angle rotation of the polarization plane upon reflection, luminescence intensity, and so on. As a result, a wafer that is within the desired specification may incorrectly appear to be outside it. Conversely, motional errors may mask the fact that the wafer is outside the specification.

Aspects and implementations of the present disclosure address this and other shortcomings of the optical inspection technology that may be used in wafer manufacturing. Described herein is an optical inspection device capable of measuring an optical response of a wafer during its transportation, detecting the wafer displacement/tilt, and analyzing the optical response using calibration data to compensate for the detected displacement. The optical inspection tool may be equipped with light sources to direct incident light at a surface of the wafer and may be further equipped with light sensors to detect light reflected from the wafer. The operation of the light sources and light sensors may be synchronized with the motion of the wafer so that the incident light is reflected from the wafer at a set of predetermined testing locations that may be selected to maximize the scope and efficiency of the inspection process.

If a broadband optical sensor is used to collect a wafer optical response data within a wide range of wavelengths $\lambda$ (such as 500-600 nm or greater), designing and calibrating such broadband sensor to detect and compensate for tilt/displacement in the entire range of wavelengths may be a very complex task. Accordingly, in some implementations of this disclosure, the optical inspection tool may have multiple "chromatic" optical sensors, each chromatic sensor detecting light within a range that is 50-100 nm wide (100-200 nm wide, in some implementations, or 20-50 nm wide, in other implementations). Each chromatic sensor may be designed and calibrated to detect and compensate, within a narrow range of wavelengths, for an error in the measured optical response of the wafer induced by the wafer's tilt and/or displacement. Using multiple chromatic sensor, instead of one broadband sensor, may offer a significant advantage by ensuring that each sensor is to detect light that travels over more homogenous optical paths within the narrower range of wavelengths $\lambda$. Additionally, chromatic sensors may be characterized by less dispersion of their various optical components, such as lens, mirrors, optical fibers, diffraction gratings, optical coatings, and so on. In some implementations, multiple chromatic sensors may be designed and operated to probe the same set of target testing locations. As a result, a number of narrow-range chromatic sensors may produce a set of complementary optical responses spanning a broad range of wavelengths $\lambda$ (e.g., spanning an entire or a substantial part of the visible spectrum, an IR, and/or a UV spectrum).

The disclosed implementations pertain to a variety of manufacturing techniques that use processing chambers (that may include deposition chambers, etching chambers, and the like), such as chemical vapor deposition techniques (CVD), physical vapor deposition (PVD), plasma-enhanced CVD, plasma-enhanced PVD, sputter deposition, atomic layer CVD, combustion CVD, catalytic CVD, evaporation deposition, molecular-beam epitaxy techniques, and so on. The disclosed implementations may be employed in techniques that use vacuum deposition chambers (e.g, ultrahigh vacuum CVD or PVD, low-pressure CVD, etc.) as well as in atmospheric pressure deposition chambers. The disclosed implementations may be advantageous for determining the morphology of the materials being tested, such as a relative concentration of different materials being deposited (e.g., the ratio of silicon to nitrogen), or a relative presence of various types of the same material (e.g., crystalline vs. amorphous silicon). The disclosed implementations may also be advantageous for determining geometry of the systems being tested, such as the thickness (and composition) of various films deposited on wafers, and so on.

FIG. 1A illustrates one exemplary implementation of a manufacturing machine 100 capable of supporting accurate optical inspection of wafers transported on a moving blade. In one implementation, the manufacturing machine 100 includes a loading station 102, a transfer chamber 104, and one or more processing chambers 106. The processing chamber(s) 106 may be interfaced to the transfer chamber 104 via transfer ports (not shown). The number of processing chamber(s) associated with the transfer chamber 104 may vary (with three processing chambers indicated in FIG. 1A, as a way of example). The transfer chamber 104 may include a robot 108, a robot blade 110, and an optical inspection tool for accurate optical inspection of a wafer 112 that is being transported by the robot blade 110 after processing in one of the processing chambers 106. The transfer chamber 104 may be held under pressure (temperature) that is higher (or lower) than the atmospheric pressure (temperature). The robot blade 110 may be attached to an extendable arm sufficient to move the robot blade 110 into the processing chamber 106 to retrieve the wafer in chamber 116 after the processing of the wafer is complete.

The robot blade 110 may enter the processing chamber(s) 106 through a slit valve port (not shown) while a lid to the processing chamber(s) 106 remains closed. The processing chamber(s) 106 may contain processing gases, plasma, and various particles used in deposition processes. A magnetic field may exist inside the processing chamber(s) 106. The inside of the processing chamber(s) 106 may be held at temperatures and pressures that are different from the temperature and pressure outside the processing chamber(s) 106.

The optical inspection tool (device) may have one or more measurement heads 114. Each measurement head 114 may include a chromatic optical sensor. Some or all of the measurement heads 114 may include a dedicated chromatic light source to produce light within a range that may be detectable by the optical sensor of that measurement head 114. In some implementations, a single light source may produce light spanning wavelengths detectable by more than one optical sensor. The plurality of optical sensors of the measurement heads 114 of the optical inspection device may be capable of sensing visible light, IR light, UV light, or other electromagnetic radiation coming from the wafer. In some implementations, the light sources may be mounted outside the inspection device, e.g., mounted inside the transfer chamber 104, the loading station 102 or the processing chambers 106.

In some implementations, the radiation coming from the wafer 112 may be a reflected radiation generated in response to irradiation of the wafer 112 by the incident light from one or more light sources. The radiation may be reflected substantially from the surface of the wafer, if the wafer material is non-transparent to a specific wavelength being used and the thickness of the wafer exceeds the penetration depth for that wavelength. In other implementations, the reflected radiation may be originating from the entire cross-section of the wafer, such as in situations where the wafer is transparent to the specific wavelength being detected or where the thickness of the wafer is less that the penetration depth of light. In some implementations, the radiation coming from the wafer may be a radiation transmitted through the wafer. For example, the sources of light may be located on one side of the wafer 112 (e.g., above or below the wafer) whereas the optical sensors may be location on the other side of the wafer 112 (below or above the wafer, respectively). In such implementations, the robot blade 110 may cover only some portions of the bottom surface of the wafer 112, leaving other portions of the bottom surface exposed to facilitate transmission of light across the thickness of the wafer 112.

A computing device 118 may control operations of the robot 108 and the optical inspection device, including operation of the measurement heads 114 and processing of data obtained by the measurement heads 114. The computing device 118 may communicate with an electronics module 150 of the robot 108. In some implementations, such communication may be performed wirelessly.

Figure 1B:
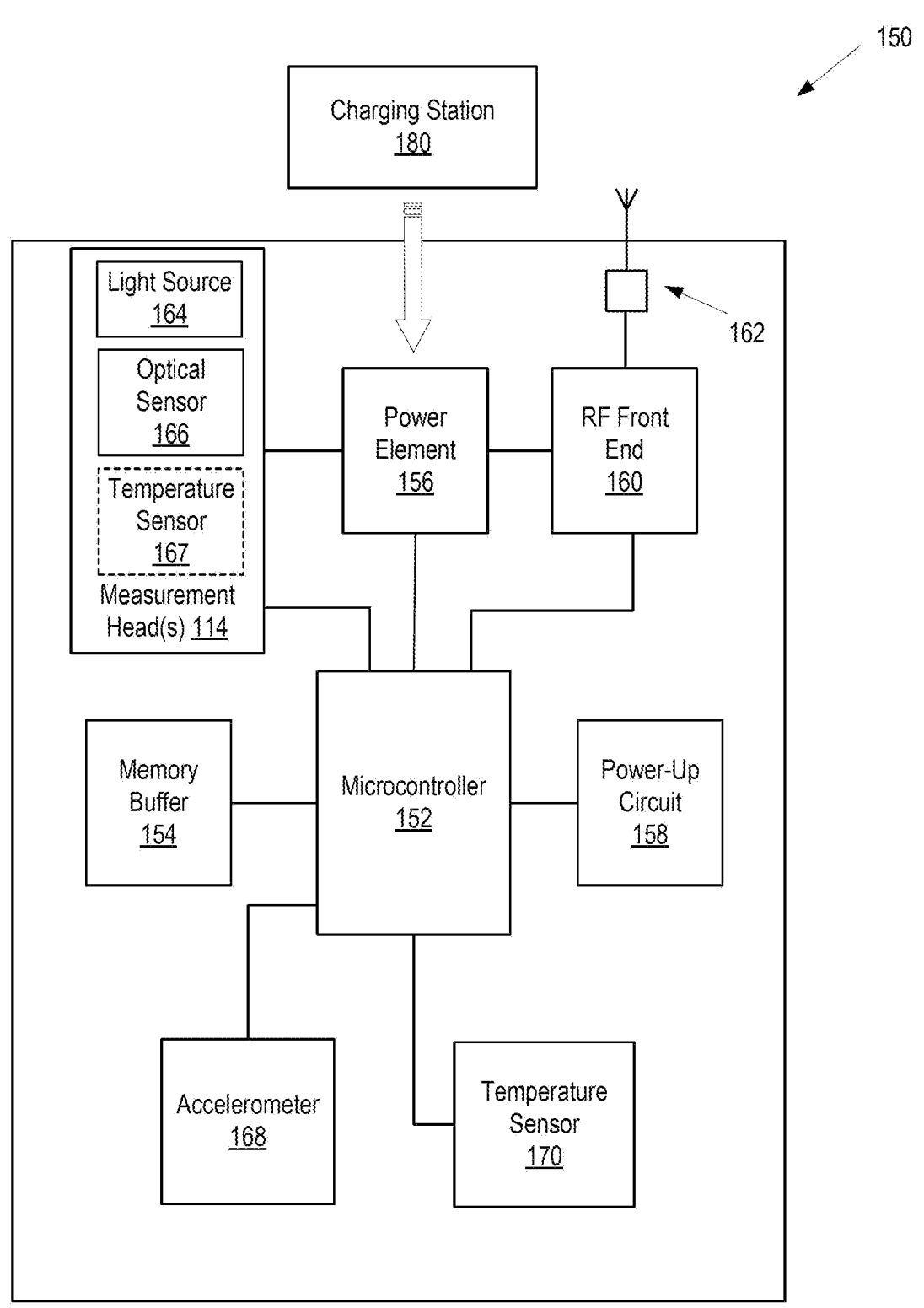
FIG. 1B illustrates an electronics module capable of supporting accurate optical inspection of wafers transported on a moving blade inside the manufacturing machine of FIG. 1A, in one exemplary implementation.

FIG. 1B illustrates the electronics module 150 capable of supporting accurate optical inspection of wafers transported on a moving blade inside the manufacturing machine 100, in one exemplary implementation. The electronics module 150 may include a microcontroller 152 and a memory buffer 154 coupled to the microcontroller 152. The memory buffer 154 may be used to collect and store optical inspection data before transmitting the inspection data to the computing device 118. In some implementations, the inspection data may be transmitted using a wireless communication circuit. In other implementations, the data may be transmitted using a wired connection between the electronics module 150 and the computing device 118. In some implementations, the optical inspection data may first be stored (buffered) in the memory buffer 154 prior to being transmitted to the computing device 118. In other implementations, the inspection data may be transmitted to the computing device 118 as the data is collected, without being stored in the memory buffer 154. In some implementations, the wireless or wired connection may be continuous. In other implementations, the wireless or wired connection may be established periodically or upon completion of the inspection or some other triggering event (e.g., when the memory buffer 154 is close to being full). The electronics module 150 may further include a power element 156 and a power-up circuit 158. In some implementations, the power element 156 may be a battery. In some implementations, the power element 156 may be a capacitor. The power element 156 may be rechargeable from a power station 180. For example, the battery or the capacitor may be recharged upon a contact (e.g., via a charging docking station) with the power station 180. In some implementations, the charging station may be connected (e.g., via a wired connection) to the power element 156. In some implementations, the connection between the charging station 180 and the power element 156 may be wireless. In some implementations, the charging station 180 may include, a power transmitter and the power element 156 may include a power receiver. When the power element 156 is low on power, the power element 156 may send a beacon signal to the find the power station 180 and the power station 180 may provide a power signal to the power element 156 until the power element 156 is recharged to the required level.

The microcontroller 152 may be coupled to one or more measurement heads 114 (one exemplary measurement head is depicted in FIG. 1B). The measurement head 114 may include a light source 164 and an optical sensor 166. The electronics module 150 may also include an accelerometer 168 to facilitate accurate extension and angular rotation of the robot blade 110. The electronics module 150 may also include a temperature sensor 170 to detect temperature near the wafer 112.

The electronics module 150 may further include a wireless communication circuit, i.e. a radio circuitry for receiving wireless instructions from the computing device 118 and for transmitting optical inspection data to the computing device 118. For example, the radio circuitry may include an RF front end module 160 and an antenna 162 (e.g., a UHF antenna), which may be an internal ceramic antenna, in one implementation. The batteries may be of a high temperature-tolerant type such as lithium ion batteries that can be exposed to a chamber temperature of 450 degrees C. for a short time period such as one to eight minutes.

Some components shown in FIG. 1B may be located on or at the stationary part of the robot 108. For example, the microcontroller 152, the memory buffer 154, and the RF front end 160 may be so located. Other components of the electronics module 150 may be located on the robot blade 110. For example, the accelerometer 168, and the temperature sensor 170 may be so located. In some implementations, some of the components of the electronics module 150 may be located both on the stationary part of the robot 108 and the extendable robot blade 110, e.g., a power element 156 may be so located. In some implementations, two separate microcontrollers may be used, with one of the microcontrollers located on the stationary part of the robot 108 and the other microcontroller located on the optical inspection device. In some implementations, a temperature sensor 167 may be a part of the measurement head 114 (as shown by a dashed box displayed therein). The temperature sensor 167 may be separate from the global temperature sensor 170 and may independently measure substrate temperature and provide information to supplement optical data in order to compensate for temperature-induced variations in the optical properties of the wafer. In some implementations, the temperature sensor 167 may be included in every measurement head 114, for precise measurement, of temperature at the testing location(s) on the wafer. In some implementations, the temperature sensor 167 may be included in only some of the measurement heads 114 (e.g., only included in the leading sensor and/or the trailing sensor). In some implementations, the temperature sensor(s) 167 may not be included in the measurement heads 114 but instead may be positioned between the measurement heads 114.

The wireless connection facilitated by the RF front end 160 and antenna 162 may support a communication link between the microcontroller 152 and the computing device 118, in some implementations. In some implementations, the microcontroller 152 integrated with the robot 108 may have a minimal computational functionality sufficient to communicate information to the computing device 118, where most of the processing of information may occur. In other implementations, the microcontroller 152 may carry out a significant portion of computations, while the computing device 118 may provide, computational support for specific, processing-intensive tasks. Data received by the computing device 118 may be data obtained from the inside of the transfer chamber 104, the processing chambers 106, data generated by the optical inspection device, data temporarily or permanently stored in the memory buffer 154, and so on. The data stored in the memory buffer 154 and/or transmitted to or from the computing device 118 may be in a raw or processed format.

In one implementation, the optical inspection device may direct (using the processing capabilities of the microcontroller 152 and/or the computing device 118) light beams produced by the light sources to one or more locations on the surface of the wafer 112 (while the wafer is being transported by the robot blade 110). The optical inspection device and collect reflected light data from each of the optical sensors of the measurement heads 114. In some implementations, there may be n optical sensors, with each of the sensors collecting reflected light data (e.g., the reflectivity $R(\lambda)$, the refractive index $n(\lambda)$, polarization data, and so on), for each one of m locations of the wafer. Using the reflected light data from the measurement heads 114, the microcontroller 152 and/or the computing device 118 may determine (e.g., using triangulation techniques), a tilt and displacement of the wafer at all or some of the m locations and retrieve calibration data, which may describe how a particular degree of tilt/displacement may affect the reflected light data. For example, a particular tilt angle may translate into a known error in determining the refractive index $n(\lambda)$ of the wafer 112. The microcontroller 152 and/or the computing device 118 may determine, based on the reflected, light data and the calibration data one or more characteristics of the wafer 112 (e.g., one or more optical properties of the wafer), such as refractive index, extinction coefficient or optical attenuation (imaginary part of the refractive index), wafer thickness, and the like, at some or all of the m locations. The microcontroller 152 (or computing device 118) may then output (and store in the memory buffer 154) one or more characteristics of representative of a quality of the wafer 112, such as a thickness of the wafer 112, characterizing uniformity, smoothness, absence of contaminants, etc.

In some implementations, the reflected light data may include information about polarization of the reflected light. For example, the light incident on the surface of the wafer may be linearly (circularly, elliptically) polarized. For example, the incident light may be an s-polarized light (or a p-polarized light). By detecting an amount of p-polarization (or s-polarization, respectively) in the reflected light, the optical inspection device may determine one of the tilt angles of the wafer. For example, if the incident light is s-polarized and the plane of incidence is parallel to the velocity of the blade's motion, the presence of the p-polarization in the reflected light may signal that the wafer has a roll tilt. Similarly, if the plane of incidence is perpendicular to the velocity of the blade's motion, the presence of the p-polarization in the reflected light may signal that the wafer has a pitch tilt. By measuring the amount of the p-polarization in these two examples, the optical processing device may determine the angle of the corresponding tilt.

Similarly, collection of polarization data may be performed using circularly or elliptically (left-hand or right-hand) polarized incident light. In some implementations, to facilitate collection of polarization data, some of the measurement heads 114 may be setup so that the planes of incidence/reflection of the respective light beams are oriented differently for different measurement heads. For example, the first measurement head 114 may operate using the plane of incidence/reflection that is parallel to the direction of the blade's motion, whereas the second measurement head may have the plane of incidence/reflection that is perpendicular to this direction. In some implementations, polarization information may also be used not only as positional data—to detect orientation of the surface of the wafer—but also to determine the morphology of the wafer, such as it uniformity and isotropy of its bulk as well as its surface (e.g., smoothness of the surface).

The computing device 118 of the manufacturing machine 100 may include a blade control module 120, an inspection control module 122 (to control operations of the light sources and optical sensors), and a wafer quality control module 124, in one implementation, as well as a central processing unit (CPU), software, and memory (as shown in FIG. 9). In some implementations, some of the functionality of the blade control module 120, the inspection control module 122, and the wafer quality control module 124 may be implemented as part of the electronics module 150 by the microcontroller 152 and the memory buffer 154.

Figure 2:
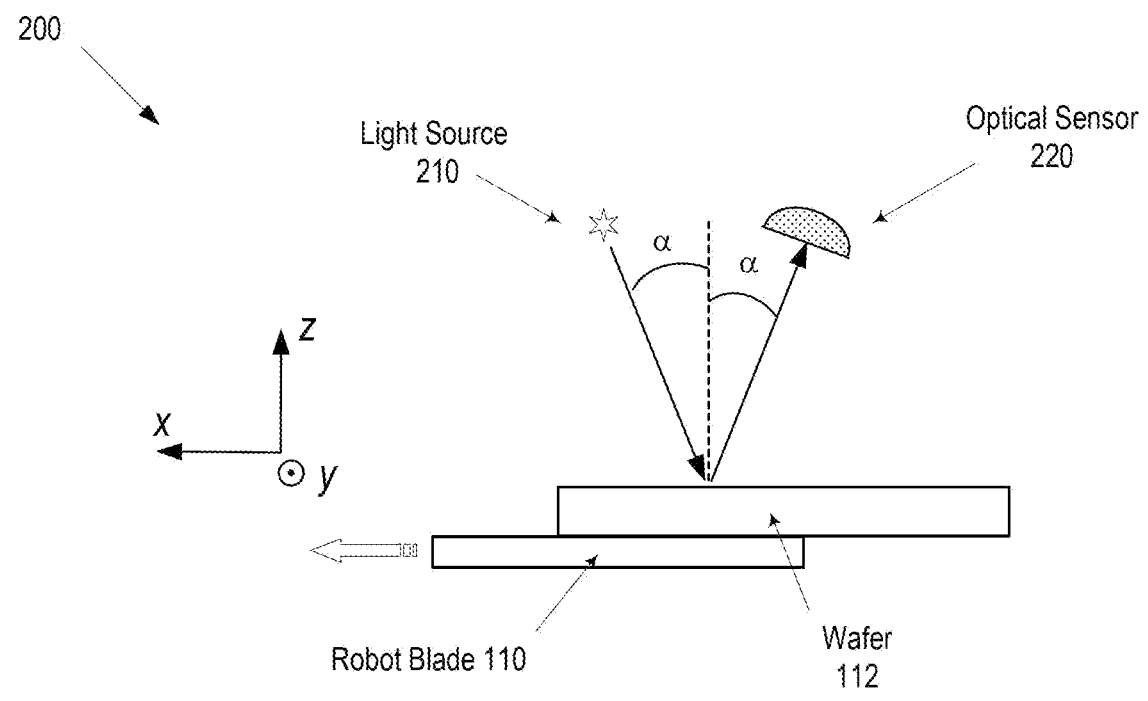
FIG. 2 illustrates an optical inspection device setup, as affected by a tilt of a wafer being transported by a moving robot blade.
Figure 2:
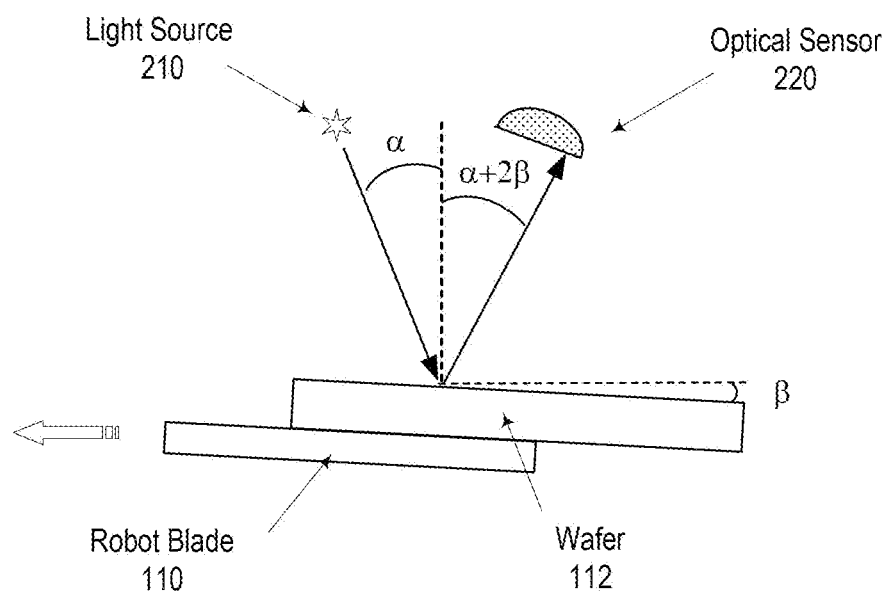

FIG. 2 illustrates an optical inspection device setup 200, as affected, by a tilt of a wafer being transported by a moving robot blade 110. The top picture in FIG. 2 illustrates an ideal situation where the wafer 112 is transported with its surface horizontal. The incident light produced by the light source 210 is making an angle α with a normal to the surface, which coincides with the vertical direction. The reflected light makes the same angle α with the vertical direction and is absorbed by an optical sensor 220. The top picture in FIG. 2 illustrates a situation where the wafer 112 experiences a tilt due to the motion of the robot blade 110. The tilt illustrated (for schematic exemplary purposes only) is a pitch tilt to an angle β from the horizontal direction (the tilt angle is exaggerated for the purpose of illustration). As a result, although the incident light makes the same angle α with the vertical direction, the reflected light makes the angle α+2β with the vertical direction. The reflected light, therefore, strikes the optical sensor 220 at a location that is different from the location shown in the top picture in FIG. 2. Implementations of this disclosure, which employ narrow-band chromatic optical sensors, make it easier to design such optical sensors 220 where a different optical path followed by the light reflected from a tilted (or displaced) wafer 112 causes less detection error. For example, it may be easier to optimize coatings of various optical elements (lenses, mirrors, etc.) for a narrower range of wavelength used by a chromatic sensor, as opposed to optimizing a variety of optical paths for a broadband sensor.

Figure 3A:
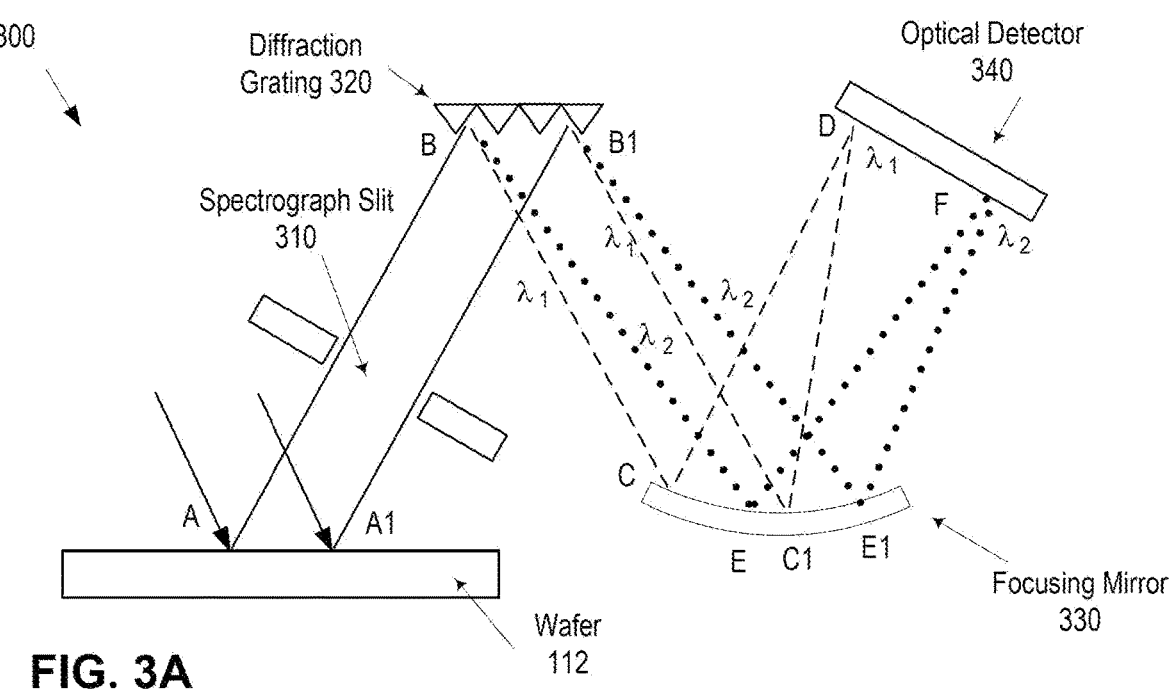
FIG. 3A illustrates an optical inspection device setup employing a diffraction grating.

FIG. 3A illustrates an optical inspection device setup 300 employing a diffraction grating. Shown in FIG. 3A is an ideal situation where the wafer 112 is transported with its surface horizontal. The light reflected from the wafer 112 may enter a spectrograph slit 310 and interact with the diffraction grating 320. The diffraction grating 320 may split the reflected light into its spectral components that may follow different optical paths. For example, a first reflected light with wavelength $\lambda_1$ (depicted schematically with dashed lines) may take optical paths ABC and $A_1B_1C_1$ whereas a second reflected light with wavelength $\lambda_2$ (depicted schematically with dotted lines) may take optical paths ABE and $A_1B_1E_1$. A focusing mirror 330 (which may be replaced with a focusing lens, in some implementations) may focus the first light to a location D of an optical detector 340 and may focus the second light to a location F of the optical detector 340.

Figure 3B:
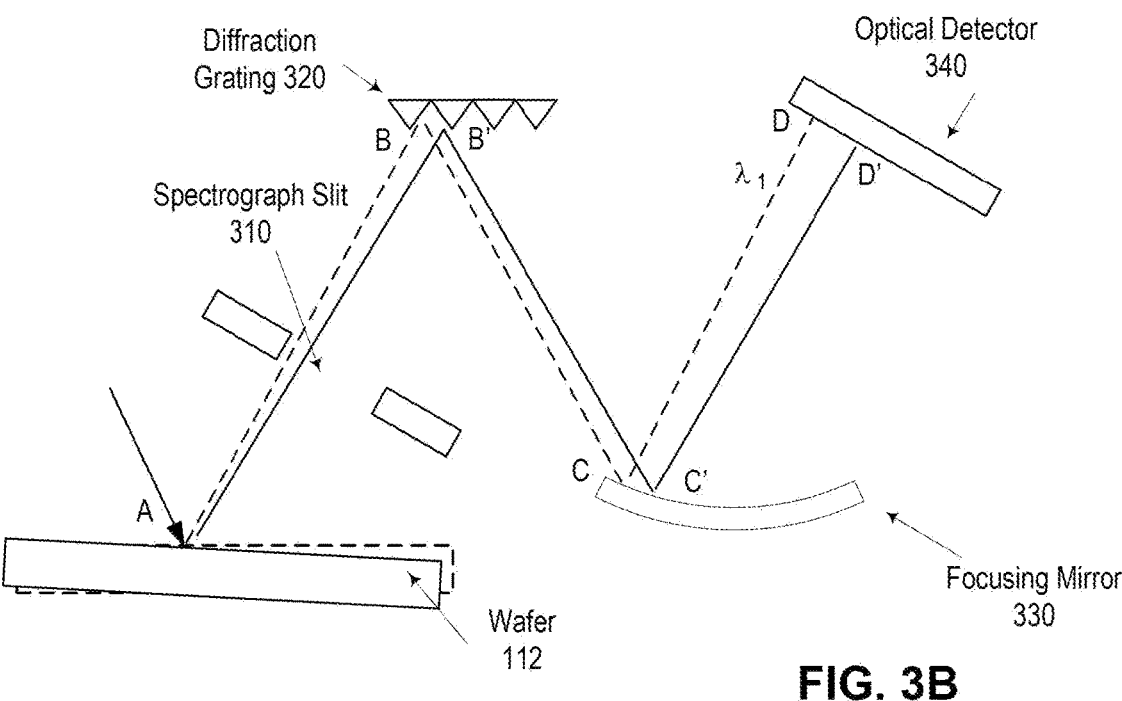
FIG. 3B illustrates the optical inspection device setup of FIG. 3A, as affected by a tilt of a wafer being transported by the moving robot blade.

FIG. 3B illustrates the optical inspection device setup of FIG. 3A, as affected by a tilt of a wafer being transported by the moving robot blade 110. A modification of the optical path ABCD (shown with dashed line) of the first reflected light of FIG. 3A is shown schematically in FIG. 3B. As a result of the tilt angle, the optical path of the first reflected light is A'B'C'D' (shown with solid line) so that the first reflected light strikes the optical detector 340 at a location D' that is different from the original location D for reflection from a horizontal wafer. The length of the optical path ABCD (with, possibly, additional reflections/refractions that may be experienced by the reflected light from additional optical elements not shown explicitly in FIGS. 3A-B) may be quite significant, reaching tens of centimeters, in some implementations. Consequently, the difference in the lengths of the paths ABCD and A'B'C'D' may be substantial (tens or even hundredth of wavelengths) even for small tilt, angles β, and the displacement of the detection point D' from reference point D may also be quite significant.

Implementations described herein, which employ narrow-band chromatic optical sensors, allow for an easier and more accurate optimization of the optical paths for various wavelengths of the reflected light if each of the optical sensors is designed to detect reflected light within a more limited (compared with a broadband sensor maw) range of wavelengths. Furthermore, making each of the optical sensors to detect light within its own limited range of wavelengths makes calibration of the sensors—for various tilt angles and/or parallel displacements—a more straightforward task and facilitates more accurate measurements when the wafer 112 deviates from an ideal horizontal transportation path.

Figure 4A:
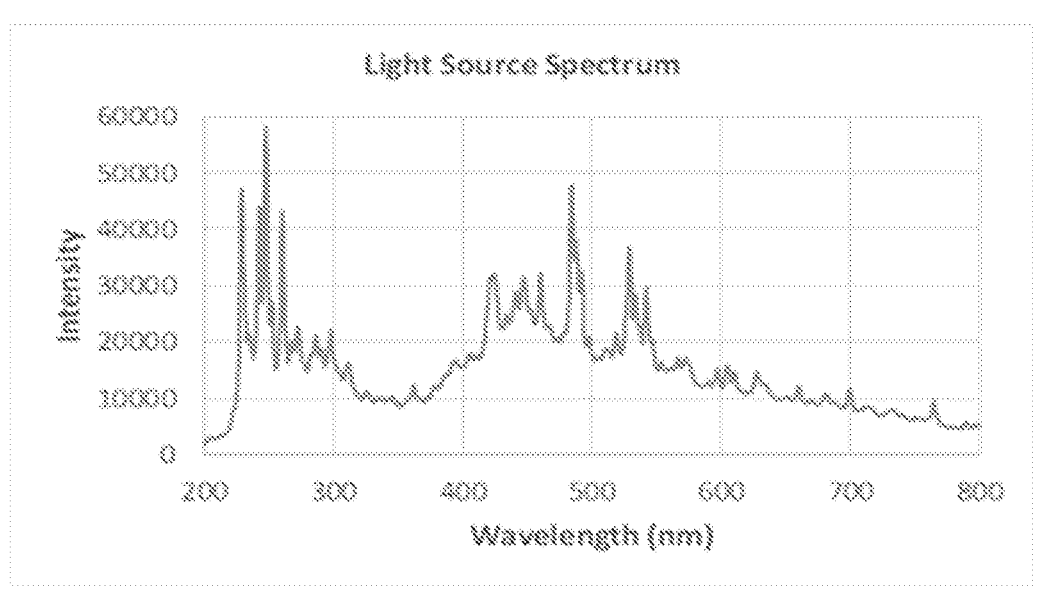
FIG. 4A depicts one exemplary spectrum of a typical light source that emits light ranging from IR range (800 nm) and down to UV range (200 nm).
Figure 4B:
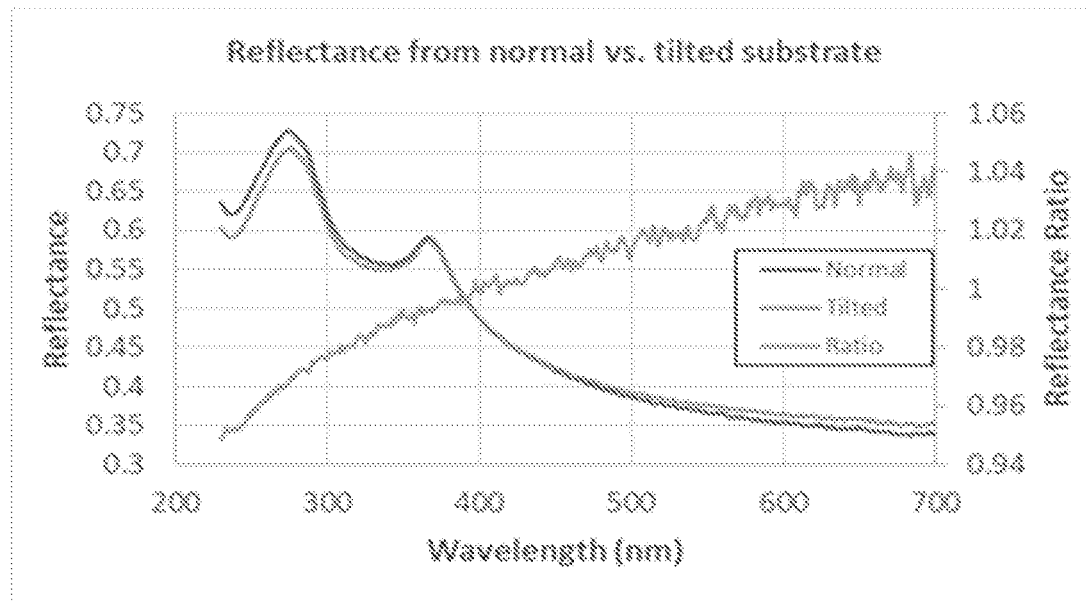
FIG. 4B illustrates an effect of the wafer tilt on the reflectance measurements, in one exemplary implementation.

FIGS. 4A-B illustrates challenges of optimizing and calibrating broadband optical sensors to account for wafer tilt and displacement during robot blade transportation. FIG. 4A depicts one exemplary spectrum of a typical light source that emits light ranging from IR range (800 nm) and down to UV range (200 nm). The spectrum may have a number of sharp emission peaks (as shown) and a broad continuum of intensity that varies significantly with the wavelength (the continuum illustrated has intensity at 450 nm that is about four times that of the intensity at 800 nm). FIG. 4B illustrates an effect of the wafer tilt on the reflectance measurements, in one exemplary implementation. Depending on a particular realization of an optical sensor, the optical paths of various wavelengths may be affected differently by the tilt. For example, in the implementation depicted, the detected reflectance in the UV range is suppressed whereas the reflectance in the IR range is enhanced. The relative error in detected reflectance may be several percent (±4%, in the situation depicted in FIG. 4B) although in other implementations the error may be more or less significant. In particular, the error may increase near sharp emission peaks. Because, as illustrated by FIG. 4B, the relative error may vary with the wavelength, calibrating such errors for various tilts may be more efficient where measurement heads 114 have chromatic optical sensors 220 dedicated to narrow optical ranges. Such chromatic sensors have significantly more uniform tilt-induced errors, and such errors may be easier to account for using a calibration procedure. For example, in a situation illustrated in FIG. 4B, using five 100 nm narrow-range detectors configured to detect light within the ranges of 200-300 nm, 300-400 nm, 400-500 nm, 500-600 nm, and 600-700 nm may ensure that the variation of the relative error is within 0.1-0.2% across any of the 100 nm ranges.

Having a more uniform optical performance within the working range of each of the chromatic optical sensors improves the accuracy of tilt/displacement compensation by, e.g., optimizing a signal-to-noise performance within each spectral range. For example, coatings and geometry (e.g., arrangement of the optical elements, design of the optical paths to be used) of each chromatic sensors may be optimized in view of the specific working range of the sensor. The use of chromatic sensors may allow replacing some elements (such as spectrograph gratings) that are characterized by a heightened sensitivity of their optical paths to the tilt/displacement of the wafer with less path-sensitive element. The use of chromatic sensors may also address a problem of oversaturation of some parts of the spectrum. For example, the use of a broadband sensor in situations depicted in FIG. 4A and FIG. 4B of a strong UV emission of the light source and a lower long-wavelength reflectance of the waver may result in a lowered sensitivity of the broadband sensor to the lone-wavelength part of the spectrum. Chromatic sensors, on the other hand, allow a variety of approaches to address this saturation. For example, signals that correspond to wavelengths with low reflectance may be selectively enhanced. This may be achieved by using optical filters (to filter out light outside the working range of the sensor), by increasing intensity of the light sources within the working wavelength range of the sensor, including making use of narrow-range light sources (such as lasers, light-emitting diodes, in some implementations), and so on.

The calibration process may be performed using one or more benchmark wafers. The benchmark wafers may be tilted (or given parallel displacements) in a controlled way and optical responses (e.g., dependence of the reflectance, index of refraction, etc.) of such wafers may be measured and stored (e.g., in the memory of the computing device 118). In some implementations, the calibration process may be performed using benchmark wafers that have various degree of chemical and morphological uniformity, smoothness of the surface, thickness, and other relevant characteristics of the wafers. The calibration process may be performed for each of the chromatic sensors used in wafer inspection. During wafer inspection, a processing device may determine a position of the surface of the inspected wafer, for example, using methods of triangulation described below. The position of the surface may be specified in terms of a displacement of the surface from a reference position (e.g., from a horizontal reference plane). The position of the surface may further be specified, in terms of the tilt (roll, pitch, yaw) angles.

Figure 5A:
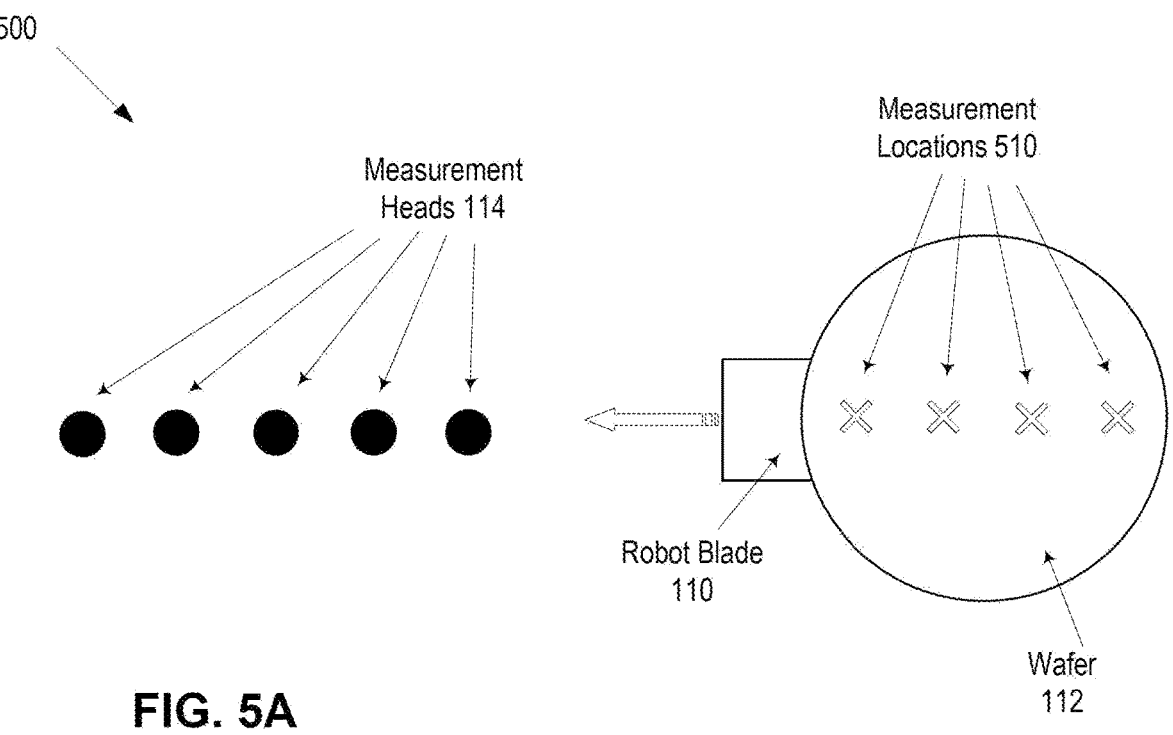
FIG. 5A illustrates a top view of one exemplary implementation of an optical inspection device capable of supporting accurate optical inspection of wafers transported on a moving blade.

FIG. 5A illustrates a top view of one exemplary implementation 500 of an optical inspection device capable of supporting accurate optical inspection of wafers transported on a moving blade. The optical inspection device may include n measurement heads 114 (a device with n=5 heads shown in FIG. 5A), arranged in a single file, collinear with the direction of the motion of the robot blade 110 as (indicated by the arrow). Each measurement head 114 may have an optical sensor having a working range of wavelengths of 50-100 nm, in various implementations. In some implementations, the range of wavelength may be greater, e.g., 100-200 nm. In some implementation, one or more of the measurement heads 114 may include a broadband sensor with a working range of 500-700 nm. Some or all of the measurement heads 114 may include a light source to produce incident light within the working range of the respective optical sensor. Some of the measurement heads 114 may use light from the same (e.g., broadband) light source and filter out the light reflected from the wafer that happens to be outside the working range of the respective sensor. In some implementations, a single light source may be used with all measurement heads 114.

As the robot blade 110 is transporting the wafer 112 (e.g., after processing in one of the processing chambers 106), the measurement heads 114 may come in proximity to m measurement locations 510 on the surface of the wafer 112 (m=4 locations are shown in FIG. 5A). This may happen sequentially, so that the rightmost measurement head 114 first comes in proximity to the leftmost measurement location, then to the second location from the left, to the third location and so on. In some implementations, the distance between two measurement heads 114 may be the same as the distance between two measurement locations 510, so that two (or more) measurement heads may perform data collection simultaneously. In other implementations, the distance between two measurement heads 114 may be different from the distance between two measurement locations 510, and some or all of the measurement heads 114 may be collecting data from various measurement locations 510 at different (e.g., staggered) times. In some implementations, the inspection control module 122 may time operations of the measurement heads 114, based on timing information provided by the blade control module 120, which indicates precise moments of time when the measurement locations 510 are in proximity with the measurement heads 114. The operations of the blade control module 120 may be precisely synchronized with the operations of the measurement heads 114 so that optical data acquisition is performed at the correct moments of time when the targeted measurement locations on the wafer are aligned with acquisition areas of the measurement heads 114. In some implementations, the operations of the blade control module 120 may be precisely synchronized with the operations of the measurement heads 114 in such a way that the first (last) target measurement locations coincide with the edges of the wafers, to determine the properties of the edges. In some implementations, when patterned wafers are being tested, the operations may be synchronized to determine the precision with which the regularity of the patterns has been achieved.

The inspection control module 122 may determine a precise moment of time when a j-th measurement location 510 is aligned with a k-th measurement head 114. The alignment may be such that a light produced by an appropriate light source (e.g., a dedicated narrow-range light source of the k-th measurement head or a shared, among multiple heads, broadband light source) is reflected from the aligned location 510 so that the reflected light strikes the optical sensor of the k-th measurement head 114. The light source may be activated for a short duration of time, in anticipation of the measurement location 510 arriving near the alignment point, and turned off when the measurement location 510 departs from the alignment point. Alternatively, the light source may provide a pulse having a fixed duration and an intensity that are selected based on the speed of the robot blade 110. For example, for faster blade operations, the duration of the pulse may be shorter whereas the intensity may be increased proportionately so that the same (or approximately the same) amount of reflected light is reaching the optical sensor. In some implementations, the fixed duration of the pulse may be in the microsecond range whereas the interval between consecutive pulses is increased with speed of the robot blade to maintain the same sampling density.

In some implementations, synchronization of the operations of the measurement heads 114 and optical data acquisition may be performed of the blade control module 120 (e.g., using a robot software). For example, the blade control module 120 may be aware of the dimensions of the product (e.g., a wafer with films deposited thereon), the locations of the measurement heads 114, and the layout of the processing chamber 106. The blade control module 120 may, therefore, communicate to the inspection control module 122 the precise times when the measurement locations are aligned with the measurement heads 114, and the inspection control module 122 may cause the measurement heads 114 to emit light towards the measurement locations. In some implementations, synchronization of the operations of the measurement heads 114 and the optical data acquisition may be performed using one or more dedicated optical sensors that detect arrival of an edge of the product (or some other representative feature of the product) into an optical inspection area. Based on the speed of the robot blade 110 (e.g., provided by the blade control module 120), and the distance from the dedicated optical sensors to the measurement heads 114, the inspection control module 122 may operate the measurement heads 114 at the precise instances when the measurement locations are aligned with the measurement beads 114. In some implementations, the measurement heads 114 may operate continuously and provide a continuous (or quasi-continuous) stream of optical data. The synchronization information may then be used to associate (e.g., to map) measured optical data to specific locations on the product.

In some implementations, one or more of the measurement heads 114 may play the role of the one or more dedicated optical sensors. For example, the first measurement head 114 may output a light signal continuously and may detect when the product's edge aligns with the first measurement head 114 (e.g., by detecting a moment when a light reflected from the edge is incident on the optical sensor of the first, measurement head 114). In some implementations, the second, third, etc., measurement heads 114 may similarly output continuous light signals. The edge arrival times for these measurement heads 114 may be used for more accurate estimates (compared with a situation where only the first measurement head 114 is used to detect edge arrival) of the motion of the product and for more precise estimation when the target measurement locations are going to be aligned with the measurement heads 114. In some implementations, the product arrival times for the first, second, third, etc., measurement head 114 may be used to correct the expected times of arrival provided by the inspection control module 122 (operating in conjunction with the blade control module 120). For example, this may be performed as follows. Initially, the times of alignment of the target measurement locations with the measurement heads 114 may be known from the estimates made by the inspection control module 122 (based on the speed of the robot blade 110, as provided by the blade control module 120, and on the spatial layout of the chamber 106). Subsequently, when the edge of the product is aligned with the first measurement head 114, the inspection control module 122 may detect a discrepancy between the expected edge arrival time and the actual edge arrival time and introduce a first correction into the estimated dynamics of the blade/product. Likewise, when the edge of the product is aligned with the second measurement head 114, the inspection control module 122 may detect another discrepancy between the new expected edge arrival time (corrected based on the edge detection by the first measurement head 114) and the actual edge arrival time and may introduce a second correction into the estimated dynamics of the blade/product. The second correction may be smaller than the first correction. This process may be repeated with each subsequent measurement head providing a more accurate determination of the dynamics of the product. In other implementations, the synchronization information may be used to map measured optical data to specific locations on the product.

In the above example, an edge of the product is used as a detection reference. In some implementations, other features of the product may be used as detection references. For example a ridge, a groove, a boundary between two parts of the product (e.g., a boundary between two dies), a specific pattern on the surface of the product, and the like, may be so used.

Figure 5B:
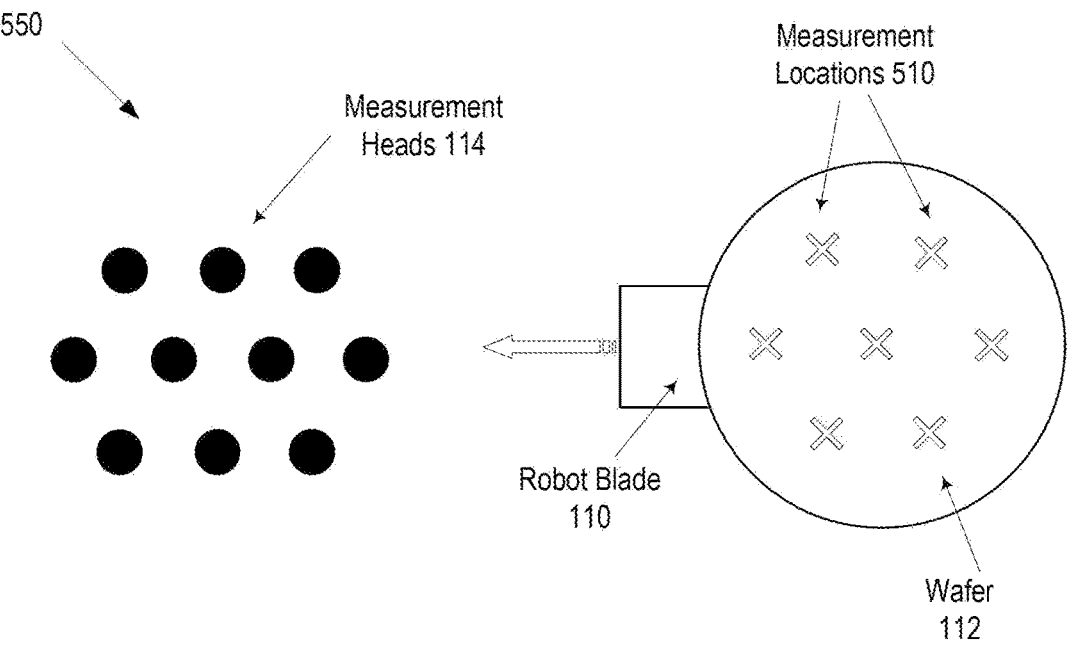
FIG. 5B illustrates another exemplary implementation of the optical inspection device capable of supporting accurate optical inspection of wafers transported on a moving blade.

FIG. 5B illustrates another exemplary implementation 550 of the optical inspection device capable of supporting accurate optical inspection of wafers transported on a moving blade. The optical inspection device shown in FIG. 5A may have n measurement heads 114 (n=10 in the example depicted), arranged in a non-collinear fashion and designed to probe a two-dimensional distribution of the measurement locations 510. Because some of the measurement locations 510 may be probed by only some (and not all) of the measurement heads 114, some of the optical sensors and/or light sources in the measurement heads 114 may be duplicative (e.g., having the same working range of wavelengths). For example, the sensors in the rightmost measurement heads 114 in each of the three rows of measurement heads 114 in FIG. 5B may be IR sensors with the same working range of 600-700 nm. In some implementations, the robot blade 110 may be capable of rotating the wafer 112 (e.g., around the wafer's center) so that a combination of a parallel motion of the wafer and its rotational motion may be used for optimization of the measurement process. For example, in some implementations, the combination of the two motions may be used to maximize the number or various measurement locations 510 accessible to the measurement heads 114 so that as wide area of the wafer 112 as possible may be inspected.

Figure 6A:
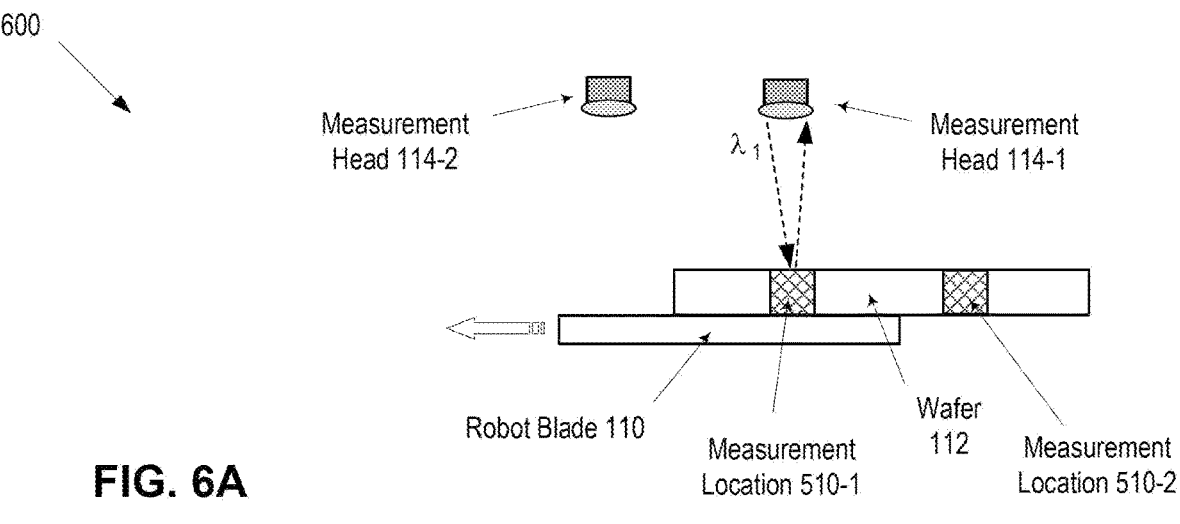
FIGS. 6A-C illustrate a side view of operations of one exemplary implementation of an optical inspection device capable of supporting accurate optical inspection of wafers transported on a moving blade.
Figure 6B:
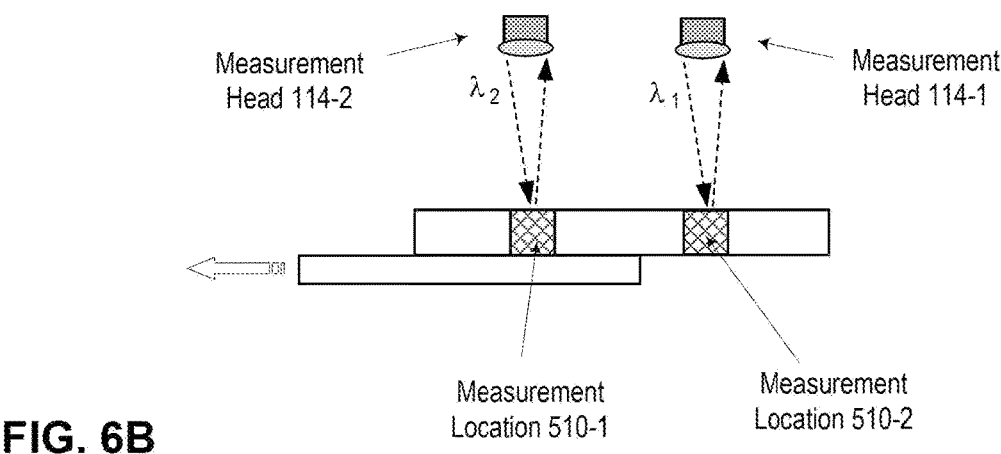
Figure 6C:
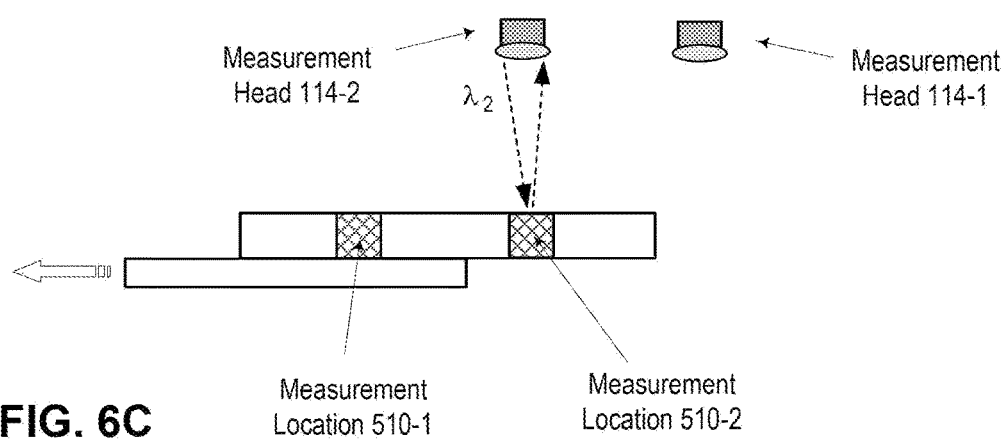

FIGS. 6A-C illustrate a side view of operations of one exemplary implementation 600 of an optical inspection device capable of supporting accurate optical inspection of wafers transported by a moving blade. For the sake of brevity and conciseness, only two measurement locations 510 and two measurement heads 114 are depicted and the tilt of the wafer is implied but not indicated explicitly. As illustrated in FIG. 6A in an exemplary fashion (the actual optical paths may differ, in various implementations), when the robot blade 110 transports the wafer sufficiently far to the left, so that a first measurement location 510-1 is aligned with a first measurement head 114-1, alight source of the first measurement head 114-1 may be activated to produce a light incident on the first measurement location 510-1. The incident light (having a first range of wavelengths) may generate a light reflected from the first measurement location 510-1 to be detected by the first measurement head 114-1. At the same time, a second measurement head 510-2 may be in an idle state and the light source of the second measurement head 114-2 may be turned off (e.g., to optimize power consumption).

As illustrated in FIG. 6B, when the robot blade 110 transports the wafer so that the first measurement location 510-1 is aligned with the second measurement head 114-2, a light source of the second measurement head 114-2 may be activated to produce a light incident on the first measurement location 510-1. This allows to probe the optical response of the first measurement location 510-1 for a second range of wavelengths (the ranges indicated schematically with symbols $\lambda_1$ and $\lambda_2$). If the distance between the measurement locations is the same as between the measurement heads, the first measurement head 114-1 may be simultaneously activated to collect data (for the first range of wavelengths) from the second measurement location 510-2.

As illustrated in FIG. 6C, when the robot blade 110 transports the wafer so that the second measurement location 510-2 is aligned with the second measurement head 114-2, a light source of the second measurement head 114-2 may be activated again to produce a light incident on the second measurement location 510-2. This allows to probe the optical response of the second measurement location 510-1 within the second range of wavelengths. At the same time, the first measurement head 510-1 may be in an idle state and its light source may be turned off.

The operations depicted in FIGS. 6A-B are intended to illustrate a general concept of sequential probing of multiple locations of the wafer using multiple optical sensors; the number of locations and optical sensors as well as the geometric arrangement of the actual elements may differ from those depicted in FIGS. 6A-B. Even though the depictions of show a near normal incidence/reflection of light from the wafer, this may not need be the case in some implementations, where angled incidence/reflection may be used instead.

Figure 7:
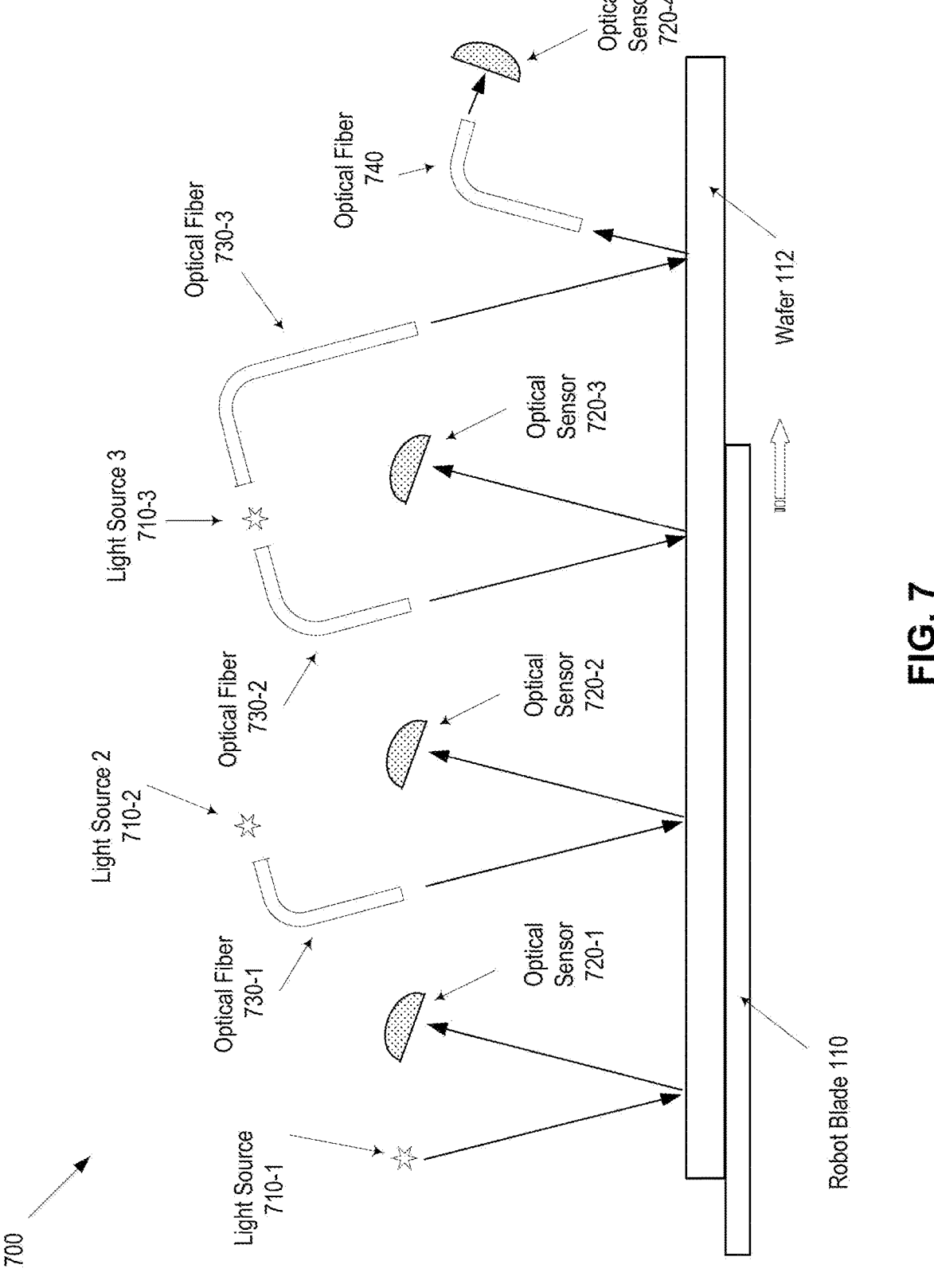
FIG. 7 illustrates exemplary implementation of light delivery system of the optical inspection device capable of supporting accurate optical inspection of wafers transported on a moving blade.

FIG. 7 illustrates exemplary implementation 700 of light delivery system of the optical inspection device capable of supporting accurate optical inspection of wafers transported by a moving blade. A first measurement head may include a light source 710-1 and an optical sensor 720-1. The light source 710-1 may be a dedicated source intended to be used only with the optical sensor 720-1. In some implementations, the light source 710-1 may be a narrow-band light source, such as a light-emitting diode, a laser, etc. In some implementations, the light source 710-1 may be a broadband source whose spectral distribution is narrowed by additional optical elements (e.g., filters, absorbers, etc.). The light generated by the light source 710-1 may be, upon reflection from the wafer 112, detected by the optical sensor 720-1.

A second measurement head may include a light source 710-2 and an optical sensor 720-2. The light source 710-2 may be a dedicated source to be used only with the optical sensor 720-2. In some implementations, the light from the light source 710-2 may be delivered to the surface of the wafer 112 by an optical fiber 730-1 in order to achieve enhanced directionality of the light incident on the wafer 112. The optical fiber 730-1 may be designed to support delivery of a specific range of wavelengths, such as a working range wavelengths for the optical sensor 720-2. For example, the material of the optical fiber may have the index of refraction $n(\lambda)$ that is sufficiently small in the IR range so that IR light can escape from the fiber. On the other hand, the index of refraction, may have a substantial imaginary part (responsible for light attenuation) in the UV range, so that UV light is absorbed inside the optical fiber 730-1 and is prevented from reaching the wafer 112.

In some implementations, a third measurement head and a fourth measurement head may have separate optical sensors (sensors 720-3 and 720-4, respectively) but share a common light source 710-3. The light from the light source 710-3 may be delivered to the wafer using separate optical fibers 730-2 and 730-3. The light delivered through the optical fibers 730-2 and 730-3 may have a substantially similar spectral content, in some implementations. In some implementations, while the light delivered to the wafer 112 (incident light) may be similar, optical filters may be used to narrow the spectral distribution of the reflected light before the reflected light reaches the optical sensors 720-3 and 720-4. In some implementations, optical fibers may be used not only to deliver an incident light to the wafer 112, but also to propagate the reflected light to the optical sensors. For example, as shown in FIG. 7, the optical fiber 740 may be used to deliver the reflected light to the optical sensor 720-4.

The light produced by the light sources 710 (e.g., any or all of the light sources 710-1 through 710-4) may be coherent beams, such as laser beams, in some implementations. In other implementations, the light sources 710 may produce natural light, linearly, circularly, or elliptically polarized light, partially-polarized light, focused light, and so on. The light sources 710 may produce a continuous beam of light or a plurality of discrete pulsed signals. The light sources 710 may produce a collimated beam of light, a focused beam of light, or an expanded beam of light. The light sources 710 may include one or more monochromatic beams having a frequency/wavelength within a narrow region of frequencies/wavelengths near some central frequency/wavelength, in some implementations.

The optical sensors 720 (e.g., any or all of the sensors 720-1 through 720-4) may be complementary metal oxide semiconductor (CMOS) sensors, or may use a charge coupled device (CCD), or any other known light detection technology. The optical sensors 720 may include any number of known optical elements, such as mirrors, lenses, absorbers, polarizers, gratings, collimators, etc. In some implementations, some or all of the optical sensors 720 may have working ranges of wavelength that are centered differently than some or of the other optical sensors 720. In some implementations, the optical sensors 720 may have a partial overlap of their working ranges.

The optical sensors 720 may communicate with the microcontroller 152 (and/or computing device 118) and may be capable of facilitating triangulation measurements. Namely, in addition to intensity data, at least some of the optical sensors may be capable of collecting positional data to determine positional data representative of a direction of the reflected light generated at the measurement locations. This positional data may be used to determine a position of the surface of the wafer at least at some of the measurement locations 510.

For example, in the optical triangulation method, the inspection control module 122 may infer a point where the line corresponding to the axis of the beam incident on the surface of the wafer 112 (produced, e.g., by any of the light sources 710) intersects the axis of the beam reflected from the wafer 112. The direction of the incident beam may be calibrated into the optical triangulation method and the direction of the reflected beam may be determined from the maximum reflected beam intensity, using an angular distribution of the reflected beam intensity, e.g., as captured by the corresponding optical sensor 720, in one implementation.

Having determined the coordinates (x, y, z) of the intersection point, the inspection control module 122 may associate this point with the measurement location on the wafer (e.g., a location on the surface of the wafer). The inspection control module 122 may also retrieve data from the blade control module 120, to determine the expected position of this measurement location at the present moment of time (given the location of the robot blade 110). By comparing the difference between the expected coordinates and the actual coordinates, the inspection control module 122 may compare this difference with similar differences determined using triangulation data from other locations and/or other optical sensors. From a plurality of such measurements, the inspection, control module may determine the tilt angles (e.g., roll, pitch, and yaw) angles and parallel displacements (along three spatial directions) of the wafer at some or all of the measurement locations 510.

The wafer quality control module 124 may then retrieve the calibration data. The calibration data may contain a (set of) table(s), or a (set of) a mathematical formula(s) or any other type of correspondence between a tilt angle or displacement distance for various wavelengths $\lambda$ and a tilt/displacement correction to the measured optical response of the wafer (e.g., reflectivity). Such correspondence may be for a discrete set of wavelengths, such as 10 (20, or any other number) per working range for the respective speaker. In some implementation, the discrete set of wavelengths may be quasi-continuous. In some implementations, tilt/displacement correction retrieved with the calibration data may be used by the wafer quality control module 124 to compensate for the detected tilt/displacement. Additionally, in some implementations, the tilt/displacement data may be used by the blade control module 120 to adjust position of the robot blade 110 to reduce tilt/displacement. In such implementations, the tilt/displacement may change (as the blade control module 120 controls to reduce them) while the wafer is being transferred between various measurement heads. Accordingly, each subsequent measurement head may collect additional tilt/displacement data to ensure that the current data reflects the actual current positioning of the wafer as accurately as possible.

Figure 8:
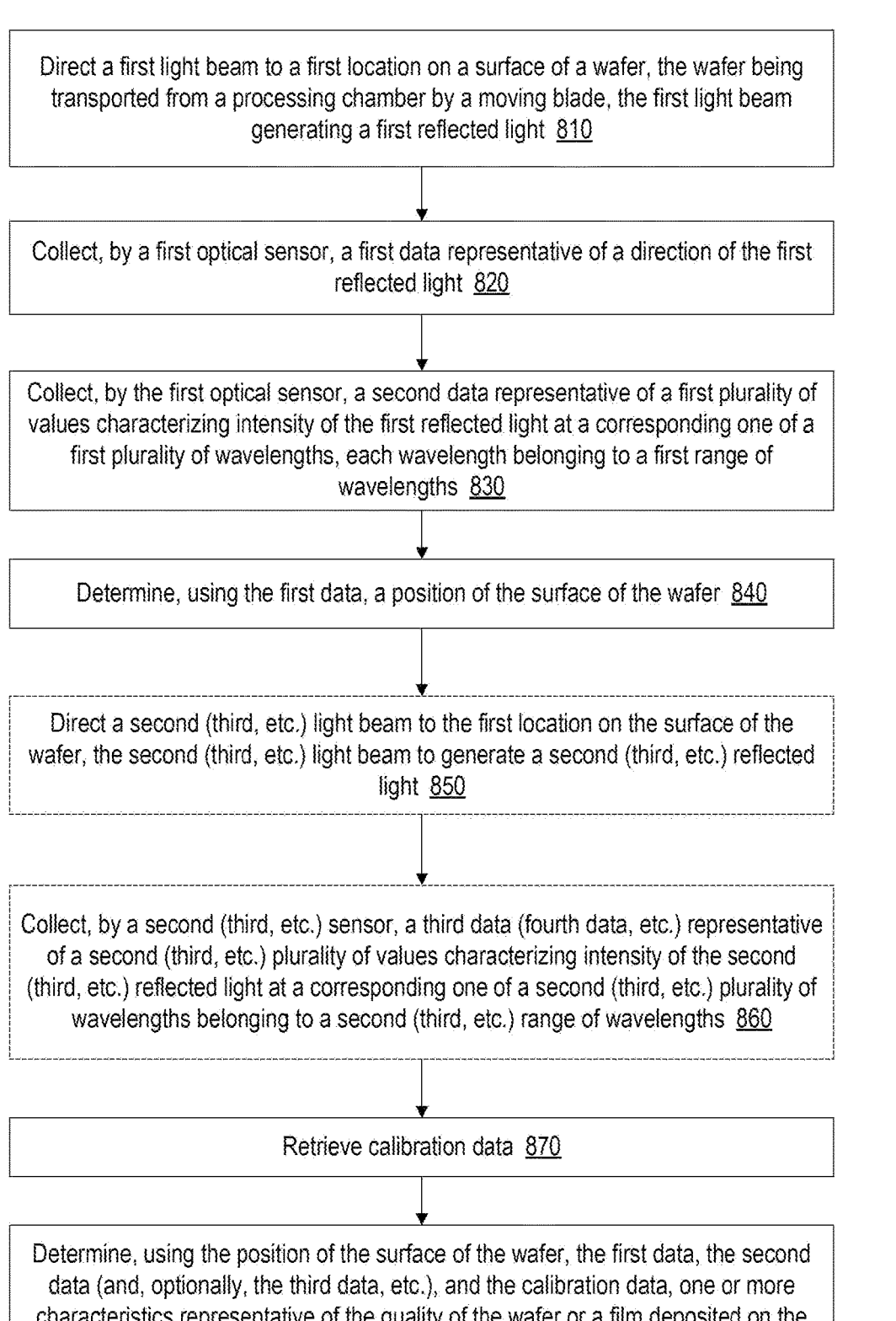
FIG. 8 is a flow diagram of one possible implementation of a method of accurate optical inspection of wafers transported by a moving blade.

FIG. 8 is a flow diagram of one possible implementation of a method 800 of accurate optical inspection of wafers transported by a moving blade. Method 800 may be performed using systems and components shown in FIGS. 1-7 or any combination thereof. Method 800 may be performed using a single optical sensor or a plurality of light sensors. Method 800 may be performed using a single light source or a plurality of light sources. Some of the blocks of method 800 may be optional. Some or all blocks of the method 800 may be performed responsive to instructions from the computing device 118 or the microcontroller 152, in some implementations. The computing device 118 may have one or more processing devices (e.g. central processing units) coupled to one or more memory devices. The method 800 may be performed without taking a manufacturing system (such as the manufacturing machine 100) off the production process. In some implementations, the method 800 may be implemented when a wafer is being retrieved from the processing chamber by a robot blade of a robot, for example while the robot blade 110 is transporting the processed wafer through the transfer chamber 104 towards the loading stations 102. For example, the robot 108 may extend the robot blade 110 from the transfer chamber 104 into the processing chamber 106 (through a transfer port) and retrieve the processed wafer from its position (116) in the processing chamber 106. The robot blade 110 may subsequently withdraw back into the transfer chamber 104. The robot 108 may then rotate the robot blade 110 towards the loading station 102 where the processed wafer 112 may be cooled down, purged from contaminants by a flow of a purging gas, deposited a receiving pod, etc. The optical inspection may be performed while the wafer is inside the transfer chamber 104 or while the wafer is inside the loading station 102. In some implementations, the optical inspection may be performed before purging; in other implementations, the optical inspection may be performed after purging. The optical inspection may be performed while the robot blade 110 implements a standard retrieval procedure, without slowing down the robot blade's motion. Accordingly, the optical inspection may be performed without delaying the manufacturing process.

The method 800 may involve a processing device (a microcontroller 152, alone or in communication with the computing device 118) causing a first light beam, produced by a first source of light, to be directed to a first location on a surface of the wafer while the wafer is being transported from the processing chamber by the moving blade (block 810). The first light beam incident on the surface of the wafer may generate, at the first location, a first reflected light.

A first optical sensor may detect the first reflected light and collect a first data representative of a direction of the first reflected light (block 820). The first data may include positional data, such as the information about the angular distribution of the first reflected light, for example the direction of the maximum intensity of the first reflected light, the width of the angular distribution, and so on. The first optical sensor may also collect a second data, which may be intensity data. The intensity data may be representative of a first plurality of values $I(\lambda_j)$ characterizing intensity I of the first reflected light at a corresponding one of a first, plurality of wavelengths $\lambda_j$, each of the first plurality of wavelengths belonging to a first range of wavelengths $\Lambda_1$ (block 830).

At block 840, method 800 may continue with the processing device determining, using the first data obtained from the optical sensor, a position of the surface of the wafer. The position of the surface may be determined relative to some reference position, such as a reference plane. For example, the position of the surface may be specified with one, two, or three tilt angles describing some or all of the roll, pitch, and yaw. The displacement of the surface of the wafer may be specified, for example, as a vertical offset from the reference plane.

In some implementations, method 800 may be performed using an optical inspection device having more than one optical sensor (and, optionally, more than one source of light). In such implementations, method 800 may continue, at an optional block 850, with the processing device causing a second light beam to be directed to the first location on the surface of the wafer. In some implementations, the second light beam may be produced by a second source of light that is different from the first source of light (e.g., the second light beam may have a different spectral distribution). In other implementations, the second light beam may be produced by the same first source of light. The second light beam may be delivered (e.g., by an optical fiber or by a direct propagation) to the first location on the surface of the wafer when the first location is aligned (or about to be aligned) with the second optical sensor. The second light beam may generate, at the first location, a second reflected light. In implementations with n>2 optical sensors, the processing device may similarly direct a third (fourth, etc.) light beam to the first location on the surface of the wafer, when the first location is aligned with the respective sensor(s), and the third (fourth, etc.) light beam may generate a third (fourth, etc.) reflected light from the first location.

At an optional block 860, method 800 may continue with collecting, by a second optical sensor, a third data that may be intensity data. The intensity data may be representative of a second plurality of values $I(\lambda_k)$ characterizing intensity of the second reflected light at a corresponding one of a second plurality of wavelengths $\lambda_k$, each of the second plurality of wavelengths belonging to a second range of wavelengths $\Lambda_2$. The second range of wavelengths $\Lambda_2$ may be centered differently than the first range of wavelengths $\Lambda_1$. In some implementations, the third data may further include positional data obtained from the second location, which may be used to supplement the positional data obtained from the first location. In some implementations, the positional data from the second location may be used to more accurately determine the tilt/displacement of the wafer. For example, if the wafer is rigidly supported by the robot blade, the tilt angles may be expected to be the same at both locations. Therefore, if positional data from two (or more) locations indicate that the tilt angles are different, this may be attributed to a measurement error. To reduce the effect of such an error, the tilt angle may be computed as some average (e.g., as the mean) of the tilt angles determined using the positional data from multiple locations. In other implementations, where the blade allows the wafer to bend during transportation, various values of the determined tilt angles may be treated as the actual tilt angles at the corresponding locations. In some implementations, the third data may only include the intensity data but not positional data. For example, the processing device may determine the tilt of the wafer based on the first data collected by the first sensor but not by the second sensor. For example, only the first sensor may include a triangulation setup whereas the remaining sensors may only collect intensity data.

Similarly, method 800 may employ additional (third, etc.) sensors that may collect additional (fourth, etc.) data representative of a further (third, etc.) plurality of values characterizing intensity of the additional (third, etc.) reflected light at a corresponding one of a (third, etc.) plurality of wavelengths belonging to additional (third, etc.) range of wavelengths ($\Lambda_3$, $\Lambda_4$, etc.).

At block 870, method 800 may continue with the processing device retrieving calibration data. The calibration data may be stored in one or more memory devices, such as the memory buffer 154 or a memory device of the computing device 118. Using the calibration data, the position of the surface of the wafer, and the second data, the processing device performing method 800 may determine one or more characteristics representative of a quality of the wafer (880). "Quality of the wafer" herein means any properties of the wafer or materials attached thereon, such as a quality of (one or more) film(s) deposited on the surface of the wafer. For example among the characteristics representative of the quality of the wafer may be a thickness of the wafer at the first location, a thickness of a film deposited on the wafer at the first location, a uniformity of the wafer at the first location, a uniformity of a film deposited on the wafer at the first location, a smoothness of the surface of the wafer at the first location, or a smoothness of a surface of a film deposited on the wafer at the first location.

FIG. 9 depicts a block diagram of an example processing device 900 operating in accordance with one or more aspects of the present disclosure and capable of supporting accurate optical inspection of wafers transported on a moving blade. The processing device 900 may be the computing device 118 of FIG. 1A or a microcontroller 152 of FIG. 1B, in one implementation.

Example processing device 900 may be connected to other processing devices in a LAN, an intranet, an extranet, and/or the Internet. The processing device 900 may be a personal computer (PC), a set-top box (STB), a server, a network router, switch or bridge, or any device capable of executing a set of instructions (sequential or otherwise) that specify actions to be taken by that device. Further, while only a single example processing device is illustrated, the term "processing device" shall also be taken to include any collection of processing devices (e.g., computers) that individually or jointly execute a set (or multiple sets) of instructions to perform any one or more of the methods discussed herein.

Example processing device 900 may include a processor 902 (e.g., a CPU), a main memory 904 (e.g., read-only memory (ROM), flash memory, dynamic random access memory (DRAM) such as synchronous DRAM (SDRAM), etc.), a static memory 906 (e.g flash memory, static random access memory (SRAM), etc.), and a secondary memory (e.g., a data storage device 918), which may communicate with each other via a bus 930.

Processor 902 represents one or more general-purpose processing devices such as a microprocessor, central processing unit, or the like. More particularly, processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. In accordance with one or more aspects of the present disclosure, processor 902 may be configured to execute instructions implementing method 800 of accurate optical inspection of wafers transported by a moving blade.

Example processing device 900 may further comprise a network interface device 908, which may be communicatively coupled to a network 920. Example processing device 900 may further comprise a video display 910 (e.g., a liquid crystal display (LCD), a touch screen, or a cathode ray tube (CRT)), an alphanumeric input device 912 (e.g., a keyboard), an input control device 914 (e.g., a cursor control device, a touch-screen control device, a mouse), and a signal generation device 916 (e.g., an acoustic speaker).

Data storage device 918 may include a computer-readable storage medium (or, more specifically, a non-transitory computer-readable storage medium) 928 on which is stored one or more sets of executable instructions 922. In accordance with one or more aspects of the present disclosure, executable instructions 922 may comprise executable instructions implementing method 800 of accurate optical inspection of wafers transported by a moving blade.

Executable instructions 922 may also reside, completely or at least partially, within main memory 904 and/or within processing device 902 during execution thereof by example processing device 900, main memory 904 and processor 902 also constituting computer-readable storage media. Executable instructions 922 may further be transmitted or received over a network via network interface device 908.

While the computer-readable storage medium 928 is shown in FIG. 9 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not, necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. An optical device comprising:
a first source of light configured to direct a first light to a first location on a surface of a product, the product being transported to or from a processing chamber, wherein the first light generates, at the first location, a first reflected light;
a first optical sensor configured to:
generate, while the product is in motion, a first data representative of a first reflected light; and
a processing device, in communication with the first optical sensor, configured to:

determine, based at least on the first data, a misalignment of the product caused by transportation of the product and comprising at least one of:
a vertical displacement of the product, or
a tilt of the product; and
determine, using the first data, a property of the product.

2. The optical device of claim 1, wherein the first data is representative of a direction of the first reflected light; and
wherein the misalignment of the product is determined based at least on a direction of the first reflected light.

3. The optical device of claim 1, wherein the first optical sensor is further to:
generate a second data representative of intensity of the first reflected light; and
wherein to determine the property of the product, the processing device is to evaluate the second data in view of the misalignment of the product.

4. The optical device of claim 3, wherein to determine the property of the product, the processing device is to evaluate the second data in view of a calibration data, wherein the calibration data characterizes intensity of light reflected by a reference product for a plurality of tilt angles of a surface of the reference product.

5. The optical device of claim 3, wherein the second data is representative of an intensity of the first reflected light for a plurality of wavelengths.

6. The optical device of claim 3, wherein the second data is representative of an intensity of the first reflected light for a plurality of polarizations.

7. The optical device of claim 3, wherein the first source of light is further to direct a first light to a second location on the surface of the product, the first light to generate, at the second location, a second reflected light;
wherein the first optical sensor is further to generate a third data representative of intensity of the second reflected light; and
wherein to determine the property of the product, the processing device is further to evaluate the third data.

8. The optical device of claim 1, wherein the product comprises:
a substrate, and
one or more films deposited on the substrate, and wherein the property of the product comprises at least one of:
a thickness of at least one film of the one or more films,
a uniformity of at least one film of the one or more films, or
a smoothness of the surface of the product.

9. The optical device of claim 1, wherein the processing device is to cause the first source of light to direct the first light to the first location responsive to the first location being transported to a position that is aligned with a direction of the first light.

10. The optical device of claim 1, further comprising:
a second source of light to direct a second light to the first location on the surface of the product, the second light to generate, at the first location, a second reflected light; and
a second optical sensor to generate a second data representative of the second reflected light; and
wherein to determine the property of the product, the processing device is further to use the second data.

11. The optical device of claim 1, wherein the property of the product comprises at least one of a refractive index of the product or an extinction coefficient of the product.

12. The optical device of claim 1, further comprising:

a plurality of n sources of light comprising the first source of light, wherein each one of the n sources of light is to direct a respective light to each of a plurality of m locations on a surface of the product, to generate, at each one of the m locations, a respective reflected light;

a plurality of n optical sensors comprising the first optical sensor, wherein each of the n optical sensors is to:

detect the respective reflected light generated by a respective one of the n sources of light at each of the m locations on the surface of the product; and generate m intensity data, wherein each of the m intensity data is representative of an intensity of the respective reflected light generated at a respective one of the m locations; and wherein to determine the property of the product, the processing device is to use the m intensity data from each of the n optical sensors.

13. The optical device of claim 12, wherein at least one of the n optical sensors is to collect positional data for at least one of the m locations, the positional data being representative of the tilt of the product, and wherein to determine the property of the product, the processing device is further to use the positional data.

14. The optical device of claim 12, wherein each one of the m locations is sequentially aligned, during transportation of the product, with the light directed by each of the n sources of light.

15. The optical device of claim 12, wherein each of the plurality of n optical sensors is to detect light within a respective range of wavelengths of a plurality of n ranges of wavelengths, and wherein each of the plurality of n ranges of wavelengths is centered differently than each other one of the plurality of n ranges of wavelengths.

16. The optical device of claim 12, wherein the processing device uses a light directed by at least one of the n sources of light to synchronize detection of a light reflected from one or more of the m locations on the surface of the product with a motion of the product.

17. A method comprising:

directing a first light, produced by a first source of light, to a first location on a surface of a moving product, the product being transported to or from a processing chamber, wherein the first light is to generate, at the first location, a first reflected light;

generating, while the product is in motion, by a first optical sensor, a first data representative of a first reflected light;

determining, based at least on the first data, a misalignment of the product caused by transportation of the product and comprising at least one of:

a vertical displacement of the product, or a tilt of the product; and determining, using the first data, a property of the product.

18. The method of claim 17, wherein the first data is representative of a direction of the first reflected light; and wherein determining the property of the product comprises:

determining, using the first data, a positioning of the surface of the product, the positioning comprising at least one of:

a vertical displacement of the surface of the product, or a tilt of the surface of the product.

19. The method of claim 17, further comprising:

generating a second data representative of intensity of the first reflected light; and wherein determining the property of the prodcut comprises:

evaluating the second data in view of the misalignment of the product.

20. The method of claim 17, further comprising:

directing, by each of a plurality of n sources of light comprising the first source of light, a respective light to each of a plurality of m locations on a surface of the product, to generate, at each one of the m locations, a respective reflected light;

detecting, by each of a plurality of n optical sensors comprising the first optical sensor, the respective reflected light generated by a respective one of the n sources of light at each of the m locations on the surface of the product, wherein each of the plurality of n optical sensors is detecting light within a respective range of wavelengths of a plurality of n ranges of wavelengths, and wherein each of the plurality of n ranges of wavelengths is centered differently than each other one of the plurality of n ranges of wavelengths; and generating m intensity data, wherein each of the m intensity data is representative of intensity of the respective reflected light generated at a respective one of the m locations; and wherein determining the property of the product comprises using the m intensity data from each of the n optical sensors.

21. A semiconductor manufacturing system, comprising:

a plurality of chambers comprising:

one or more processing chambers, and a transfer chamber interfacing the one or more processing chambers;

a first source of light to:

direct a first light to a first location on a surface of a product, the product being transported between at least two of the plurality of chambers, the first light generating, at the first location, a first reflected light;

a first optical sensor to:

generate, while the product is in motion, a first data representative of a first reflected light; and a processing device, in communication with the first optical sensor, to:

determine, based at least on the first data, a misalignment of the product caused by transportation of the product and comprising at least one of:

a vertical displacement of the product, or a tilt of the product; and determine, using the first data, a property of the product.

* * * * *